(12) United States Patent
Ando

(10) Patent No.: US 11,431,874 B2
(45) Date of Patent: Aug. 30, 2022

(54) INFORMATION PROCESSING SYSTEM TO SECURELY UPLOAD IMAGE DATA

(71) Applicant: Ricoh Company, Ltd., Tokyo (JP)

(72) Inventor: Mitsuo Ando, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/677,941

(22) Filed: Nov. 8, 2019

(65) Prior Publication Data

US 2020/0169644 A1 May 28, 2020

(30) Foreign Application Priority Data

Nov. 28, 2018 (JP) .............................. JP2018-222548
Nov. 28, 2018 (JP) .............................. JP2018-222826

(51) Int. Cl.
*H04N 1/32* (2006.01)
*G06K 7/14* (2006.01)
*G06K 19/10* (2006.01)

(52) U.S. Cl.
CPC ....... *H04N 1/32368* (2013.01); *G06K 7/1417* (2013.01); *G06K 19/10* (2013.01); *H04N 1/32443* (2013.01); *H04N 2201/3285* (2013.01)

(58) Field of Classification Search
None
See application file for complete search history.

(56) References Cited

U.S. PATENT DOCUMENTS

| | | |
|---|---|---|
| 2004/0075857 A1 | 4/2004 | Akiyoshi et al. |
| 2004/0218208 A1 | 11/2004 | Akiyoshi et al. |
| 2004/0255263 A1 | 12/2004 | Ando |
| 2006/0070087 A1 | 3/2006 | Ando et al. |
| 2007/0047017 A1 | 3/2007 | Ando et al. |
| 2007/0012451 A1 | 5/2007 | Ando |
| 2008/0005029 A1 | 1/2008 | Ando |
| 2008/0066084 A1 | 3/2008 | Akiyoshi et al. |
| 2008/0098389 A1 | 4/2008 | Akiyoshi et al. |
| 2009/0019440 A1 | 1/2009 | Ando |
| 2009/0276826 A1 | 11/2009 | Ando |

(Continued)

FOREIGN PATENT DOCUMENTS

| | | |
|---|---|---|
| JP | 2011-151563 A | 8/2011 |
| JP | 2014-149633 | 8/2014 |
| JP | 2014-197387 A | 10/2014 |

OTHER PUBLICATIONS

Office Action dated May 31, 2022 in Japanese Patent Application No. 2018-222548, 10 pages.

*Primary Examiner* — Andrew H Lam
(74) *Attorney, Agent, or Firm* — Xsensus LLP

(57) ABSTRACT

An information processing system, including an information processing apparatus communicable with a device, includes circuitry configured to receive, from the device, identification information identifying a service providable by the information processing apparatus, transmit, to the device, a process execution request to implement the service of activating an imaging function of the device, and causing the device to upload the image data captured by using the imaging function to the information processing apparatus, the service corresponding to the identification information, and store the image data captured using the imaging function in a memory.

27 Claims, 21 Drawing Sheets

(56) References Cited

U.S. PATENT DOCUMENTS

| | | |
|---|---|---|
| 2010/0309502 A1 | 12/2010 | Ando et al. |
| 2011/0085196 A1* | 4/2011 | Liu ................ G06F 3/1204 358/1.15 |
| 2012/0200390 A1* | 8/2012 | Saravanan ............ G07C 9/27 340/5.61 |
| 2012/0311189 A1* | 12/2012 | Yamada ............. G06F 15/167 709/248 |
| 2013/0051692 A1* | 2/2013 | Kakutani ........... H04N 1/32133 382/233 |
| 2013/0073719 A1 | 3/2013 | Ando |
| 2013/0114095 A1 | 5/2013 | Akiyoshi et al. |
| 2013/0185605 A1 | 7/2013 | Ando et al. |
| 2013/0242331 A1 | 9/2013 | Ando |
| 2013/0258407 A1 | 10/2013 | Akiyoshi et al. |
| 2013/0308161 A1 | 11/2013 | Ando et al. |
| 2014/0016165 A1 | 1/2014 | Ando |
| 2015/0186188 A1 | 7/2015 | Ando |
| 2015/0264200 A1 | 9/2015 | Ando |
| 2015/0281332 A1 | 10/2015 | Naito et al. |
| 2016/0119506 A1 | 4/2016 | Namihira et al. |
| 2016/0198210 A1* | 7/2016 | Torikai ................ G06F 21/606 348/207.1 |
| 2016/0342577 A1 | 11/2016 | Ando |
| 2017/0102865 A1 | 4/2017 | Ando |
| 2017/0272601 A1 | 9/2017 | Ando |
| 2017/0339232 A1 | 11/2017 | Ando |
| 2018/0084121 A1 | 3/2018 | Ando |
| 2018/0176417 A1 | 6/2018 | Ando |
| 2019/0020770 A1* | 1/2019 | Araki ................ H04N 1/00233 |
| 2019/0034126 A1* | 1/2019 | Iwashita ............ H04N 1/00408 |
| 2020/0126439 A1* | 4/2020 | Shah .................. H04L 63/0428 |

\* cited by examiner

FIG. 8

| TENANT ID | COMMUNICATION ID | ADDRESS INFORMATION | STATE INFORMATION | BROWSER ID | BROWSER STATE | PASSCODE |
|---|---|---|---|---|---|---|
| T001 | Eg001-01 | 10.56.60.xx | CONNECTED | BROWSER1 | POWER ON | 1234 |
| | Eg001-02 | 196.168.0.xx | NOT CONNECTED | BROWSER2 | POWER SAVING | 2293 |
| | | | | BROWSER3 | POWER OFF | 8341 |
| .. | .. | .. | .. | .. | .. | .. |

| REGISTRATION ID | IN-APPLICATION ID | OUT-APPLICATION ID | BROWSER ID |
|---|---|---|---|
| Tag_Ed | AP_EdPortal | – | – |
| Tag_St | AP_Stcamera | – | – |
| *Tag_StPhotoCode* | *AP_StPhoto* | *AP_PhotoDoc* | – |
| Tag_StPhoto1 | AP_StPhoto | AP_PhotoDoc | BROWSER1 |
| Tag_StPhoto2 | AP_StPhoto | AP_PhotoDoc | BROWSER2 |
| Tag_StPhoto3 | AP_StPhoto | AP_PhotoDoc | BROWSER3 |
| *Tag_StDocCode* | *AP_StDoc* | *AP_PhotoDoc* | – |
| Tag_StDoc1 | AP_StDoc | AP_PhotoDoc | BROWSER1 |
| Tag_StDoc2 | AP_StDoc | AP_PhotoDoc | BROWSER2 |
| Tag_StDoc3 | AP_StDoc | AP_PhotoDoc | BROWSER3 |

| APPLICATION ID | APPLICATION TYPE | URL | CORRESPONDING BROWSER |
|---|---|---|---|
| AP_Camera | In | https://daas.com/camera | TERMINAL-USE BROWSER |
| AP_Upload | In | https://daas.com/upload | TERMINAL-USE BROWSER |
| AP_PhotoDoc | Out | https://daas.com/photoDoc | APPARATUS-USE BROWSER |
| AP_EdPortal | - | https://daas.com/EdPortal | TERMINAL-USE BROWSER |
| AP_StPortal | In | https://daas.com/StPortal | TERMINAL-USE BROWSER |
| AP_StPhoto | In | https://daas.com/StPhoto | TERMINAL-USE BROWSER |

| TENANT ID | USER ID | PASSWORD |
|---|---|---|
| T001 | student | × × × |
| | tanaka | ・・・ |
| | sato | ・・・ |

| TENANT ID | CLASS NUMBER | LECTURE ROOM NUMBER | START TIME | IN-CLASS TIME | TEACHER | CONTENT ID |
|---|---|---|---|---|---|---|
| T001 | Math A_01 | A001 | 10/25/10:00 | 60 | tanaka@ | Answer Sheet_Math A_01 |
| | | | | | | WB_Math A_01 |
| | Math A_02 | A002 | 10/26/11:00 | 120 | bigben@ | Display_Math A_01 |
| | | | | | | Answer Sheet_Math A_02 |
| | Eng A_01 | A003 | ... | ... | ... | ... |

| CONTENT ID | USER ID | STUDENT NUMBER | FILE ID | UPLOAD TIME | PASSCODE |
|---|---|---|---|---|---|
| Answer Sheet_Math A_01 | tokiwa@ | 1234 | 1000 | 10/25/10:08 | 3200 |
| | saito@ | 1235 | 1001 | 10/25/10:08 | 3289 |
| | ando@ | 1236 | 1002 | 10/25/10:08 | 0000 |
| Answer Sheet_Math A_02 | tokiwa@ | 1234 | 1100 | ... | 3256 |

| CONTENT ID | USER ID | FILE ID | DATE |
|---|---|---|---|
| WB_Math A_01 | tanaka@ | 2000 | 10/25/10:14 |
| | tanaka@ | 2001 | 10/25/10:14 |
| ... | ... | ... | ... |

| CONTENT ID | BROWSER ID |
|---|---|
| Display_Math A_01 | BROWSER1 |
| ... | ... |

| DATE | BROWSER ID | PASSCODE |
|---|---|---|
| 10/25/10:00 | BROWSER1 | 3200 |
| 10/25/10:15 | BROWSER1 | 3289 |
| 10/25/10:30 | BROWSER1 | 3256 |

| DATE | BROWSER ID | USER ID | FILE ID |
|---|---|---|---|
| 10/25/10:00 | BROWSER1 | tanaka@ | 1000 |
| 10/25/10:10 | BROWSER1 | tanaka@ | 1001 |
| 10/25/10:20 | BROWSER1 | ando@ | 1002 |

⟨STATUS OF ATTENDANCE OF Math A_01, LECTURE ROOM A001, 10/25/10:00→⟩

| USER ID | STUDENT NUMBER | ANSWER SHEET SUBMISSION | LECTURE ATTENDANCE | ATTENDANCE/ SUBMISSION | SUPPLEMENTARY COLUMN |
|---|---|---|---|---|---|
| tokiwa@ | 1234 | YES | YES | YES | NAME IS IN ANSWER SHEET INFORMATION STORAGE UNIT, UPLOAD TIME AND PASSCODE MATCH, AND WITHIN LECTURE TIME |
| saito@ | 1235 | YES | YES | YES | NAME IS IN ANSWER SHEET INFORMATION STORAGE UNIT, UPLOAD TIME AND PASSCODE MATCH, AND WITHIN LECTURE TIME |
| ando@ | 1236 | YES | NO | ONLY ANSWER SHEET | NAME IS IN ANSWER SHEET INFORMATION STORAGE UNIT, UPLOAD TIME WITHIN LECTURE TIME, BUT DOES NOT MATCH PASSCODE |
| araki@ | 1237 | — | — | NO | NO NAME IN ANSWER SHEET CONTENT |

# INFORMATION PROCESSING SYSTEM TO SECURELY UPLOAD IMAGE DATA

CROSS-REFERENCE TO RELATED APPLICATIONS

This application claims priority pursuant to 35 U.S.C. § 119(a) to Japanese Patent Application Nos. 2018-222826, filed on Nov. 28, 2018 and 2018-222548 filed on Nov. 28, 2018 in the Japan Patent Office, the disclosure of which are incorporated by reference herein in their entirety.

BACKGROUND

Technical Field

This disclosure relates to an information processing system, an information processing apparatus, and a method of processing information.

Background Art

Various devices and apparatuses are used in offices to perform various business operations. It is expected that efficiency of the various business operations can be improved by utilizing various devices and apparatuses. A technology that can automatically store image data of an image captured by a terminal device in a pre-set storage destination is known. For example, a terminal device installed with a dedicated application is used to read a quick response (QR) code (registered trademark). After reading the QR code using the terminal device, the image data obtained by reading the QR code is stored in a storage destination indicated by the QR code.

SUMMARY

As one aspect of the present disclosure, an information processing system including an information processing apparatus communicable with a device is devised. The information processing system includes circuitry configured to receive, from the device, identification information identifying a service providable by the information processing apparatus, transmit, to the device, a process execution request to implement the service of activating an imaging function of the device, and causing the device to upload the image data captured by using the imaging function to the information processing apparatus, the service corresponding to the identification information, and store the image data captured using the imaging function in a memory.

As another aspect of the present disclosure, an information processing apparatus communicable with a device, is devised. The information processing apparatus includes circuitry configured to receive, from the device, identification information identifying a service providable by the information processing apparatus, transmit, to the device, a process execution request to implement the service of activating an imaging function of the device, and causing the device to upload the image data captured by using the imaging function to the information processing apparatus, the service corresponding to the identification information, and store the image data captured using the imaging function in a memory.

As another aspect of the present disclosure, a method of processing information in an information processing system including an information processing apparatus communicable with a device is devised. The method includes receiving, from the device, identification information identifying a service providable by the information processing apparatus, transmitting, to the device, a process execution request to implement the service of activating an imaging function of the device, and causing the device to upload the image data captured by using the imaging function to the information processing apparatus, the service corresponding to the identification information, and storing the image data captured using the imaging function in a memory.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 8 is an example of information stored in an apparatus information storage unit according to the first embodiment;

FIG. 9 is an example of information stored in a registration information storage unit according to the first embodiment;

FIG. 10 is an example of information stored in an application information storage unit according to the first embodiment;

FIG. 14 is an example configuration of an account information storage unit according to the first embodiment;

FIG. 17 is an example of a class information storage unit according to the first embodiment;

FIG. 18 is an example of an answer sheet information storage unit according to the first embodiment;

FIG. 19 is an example of a board information storage unit according to the first embodiment;

FIG. 20 is an example of a browser identification information storage unit according to the first embodiment;

FIG. 21 is an example of a passcode history storage unit according to the first embodiment;

FIG. 22 is an example of a display history storage unit according to the first embodiment;

FIG. 24 is an example of display on a teacher terminal according to the first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

A description is now given of exemplary embodiments of the present disclosure. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present disclosure.

In addition, it should be noted that the terminology used herein is for the purpose of describing particular embodiments only and is not intended to be limiting of the present disclosure. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

First Embodiment

Figure 1:
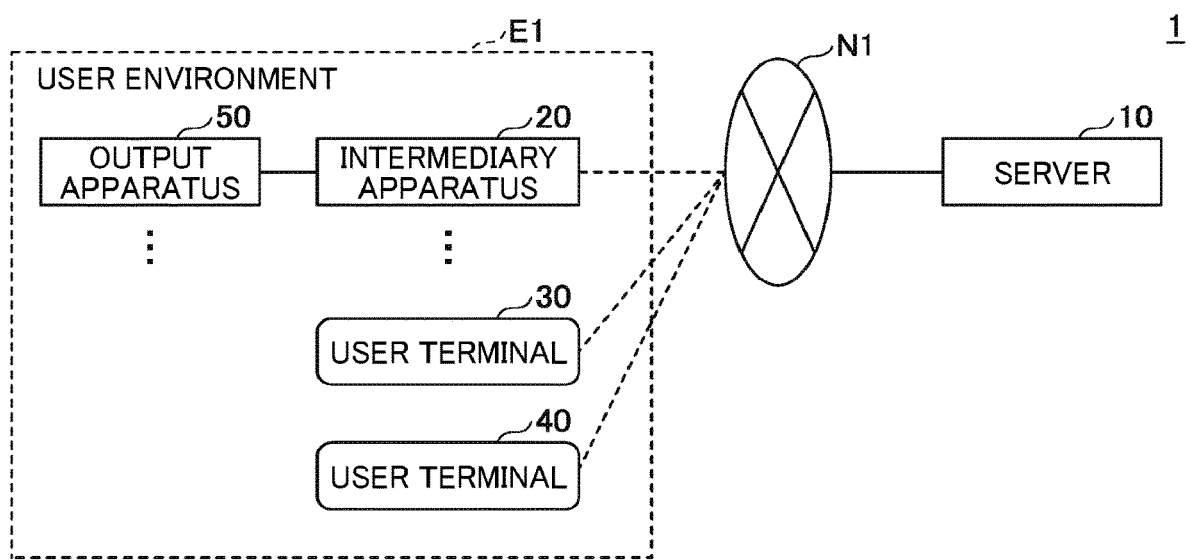
FIG. 1 is an example system configuration of an information processing system according to a first embodiment.

Hereinafter, a description is given of an information processing system 1 of a first embodiment with reference to FIG. 1. FIG. 1 is an example system configuration of the information processing system 1 according to the first embodiment. The information processing system 1 includes, for example, a server 10, and a user environment E1 including one or more apparatuses, such as user terminals 30 and 40, intermediary apparatuses 20, and output apparatuses 50.

In the information processing system 1 of FIG. 1, the server 10 and the user environment E1 can communicate with each other via a network N1, such as a wide area network using the Internet. The network N1 can be any network that can be accessed within a pre-set range, such as an Intranet.

The user environment E1 indicates a system environment of an entity, such as a company, having one or more apparatuses, such as one or more output apparatus 50, and one or more intermediary apparatuses 20. The output apparatus 50 is an apparatus for displaying an input image using a display unit. The output apparatus 50 is, for example, a projector or an electronic whiteboard. In the user environment E1, each of the output apparatuses 50 is connected to each of the intermediary apparatuses 20 corresponding to each of the output apparatus 50. That is, the output apparatus 50 and the intermediary apparatus 20 are associated with each other one-to-one. The output apparatus 50 and the intermediary apparatus 20 can be connected via an interface compatible to a standard of image transmission, such as high definition multimedia interface (HDMI: registered trademark). For example, a computer such as an HDMI (registered trademark) dongle, a stick personal computer (PC) or the like can be used as the intermediary apparatus 20.

For example, the output apparatus 50 and the intermediary apparatus 20 can be connected using a cable, such as an HDMI (registered trademark) cable, corresponding to the interface. Alternatively, a connector of the intermediary apparatus 20 compatible to the interface and a connector of the output apparatus 50 compatible to the interface can be connected directly. For example, when the connector of the intermediary apparatus 20 is inserted into the connector of the output apparatus 50, the intermediary apparatus 20 and the output apparatus 50 can be connected. Alternatively, the intermediary apparatus 20 and the output apparatus 50 can be connected using wireless communication, or connected via a network.

By connecting the output apparatus 50 and the intermediary apparatus 20 as described above, the intermediary apparatus 20 can transmit to-be-projected images to the output apparatus 50. Hereinafter, the output apparatus 50 may mean one or more projectors and the intermediary apparatus 20 may mean one or more intermediary apparatuses.

The intermediary apparatus 20 is connected to the network N1 via the local area network (LAN) set in the user environment E1. The intermediary apparatus 20 can be wirelessly connected to the network, such as LAN, set in the user environment E1. The intermediary apparatus 20, installed with a web browser, executes the web browser to perform various processing in response to receiving a process execution request for image data, transmitted from the server 10, and controls an apparatus, such as the output apparatus 50, in which the processing result is output using the output apparatus 50.

Specifically, in the first embodiment, the intermediary apparatus 20 causes the output apparatus 50 to perform outputting the image data, such as displaying of image data. That is, the intermediary apparatus 20 mediates the output (e.g., display) of image data using the output apparatus 50 for the image data transmitted from the server 10.

In the first embodiment, the intermediary apparatus 20 outputs (displays) specific information specifying the output apparatus 50, from the output apparatus 50. The specific information is information that can be acquired only when a user of the user terminal 40 is present in the vicinity of the output apparatus 50, and the specific information is information that changes over time.

In the first embodiment, when the user terminal 40 transmits (uploads) image data to the server 10, the user terminal 40 assigns the specific information to the uploaded image data.

Thus, the server 10 can use or manage the specific information as information indicating a position (location) and a time zone of the user terminal 40 when the image data is uploaded. In other words, in the first embodiment, the server 10 can control or manage the uploaded image data by associating the uploaded image data with the information indicating the position (location) and the time, such as, time point, time period, or time zone when the image data was captured.

When a QR code is read by the user terminal 40, the server 10 causes the user terminal 40 to activate an imaging function and to transmit image data and the specific information captured by the user terminal 40 to a storage destination associated with the QR code.

Therefore, in the first embodiment, by simply placing the user terminal 40 over the QR code, the captured image data can be transmitted to the designated storage destination (upload destination).

Each of the user terminals 30 and 40 is an information processing terminal used by each user in the user environment E1. For example, smartphones, tablet devices, PC, or cellular phones can be used as the user terminals 30 and 40, which can be carried by each user. The user terminals 30 and 40 can be connected to the network N1 using, for example, a mobile communication network, without using the LAN provided in the user environment E1. However, the user terminals 30 and 40 can be also connected to the network provided in the user environment E1. In this description, the user terminal 40 can be used as a device for acquiring or capturing various types of information, such as image, text, code, signal or the like, associated with a target or target object.

In the first embodiment, for example, when the server 10 receives an instruction from the user terminal 30 for image data uploaded to the server 10 via the network N1, the image data can be displayed using the output apparatus 50 via the intermediary apparatus 20.

The server 10 is one or more computers that execute a process of outputting the image data designated at the user terminal 30 or 40 using the output apparatus 50 based on a simple operation using the user terminal 30 or 40.

Further, the server 10 is one or more computers that execute a process of storing image data captured by the user terminals 30 or 40 in a pre-set storage destination by performing a simple operation using the user terminals 30 or 40. Further, the server 10 can be disposed in the user environment E1.

Figure 2:
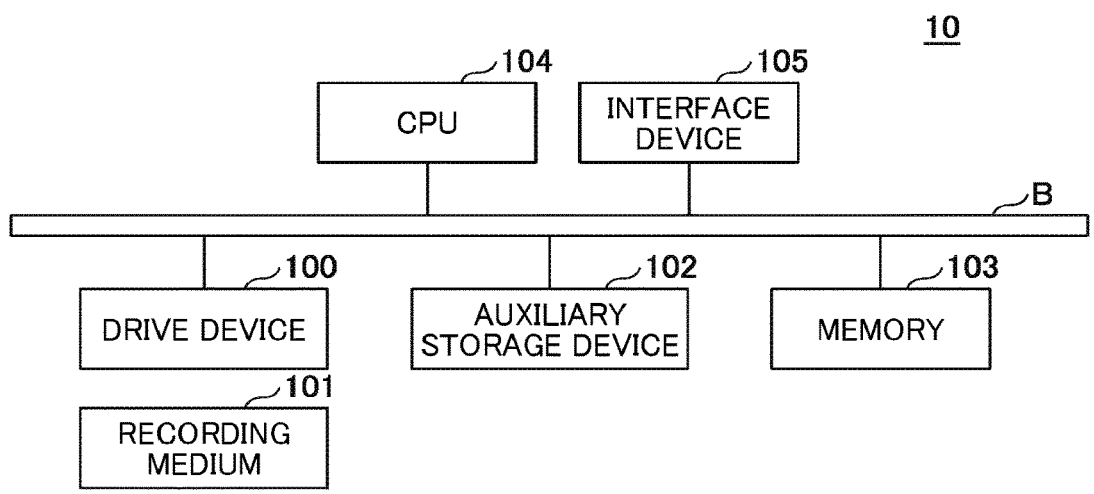
FIG. 2 is an example block diagram of a hardware configuration of a server according to the first embodiment.

FIG. 2 is an example block diagram of a hardware configuration of the server 10 according to the first embodiment. In this description, the server 10 is described as an example of information processing apparatus. As indicated in FIG. 2, the server 10 includes, for example, a drive device 100, an auxiliary storage device 102, a memory 103, a central processing unit (CPU) 104, and an interface device 105, which are connected to each other by a bus B.

One or more programs for implementing the processing in the server 10 can be provided by a recording medium 101 such as a compact disk read only memory (CD-ROM). When the recording medium 101 storing the program is set in the drive device 100, the program is installed on the auxiliary storage device 102 via the drive device 100 from the recording medium 101. However, the program installation does not necessarily need to be carried out by the recording medium 101, but may instead be downloaded from another computer via the network. The auxiliary storage device 102 stores the installed program and stores the necessary files and the like. In this description, the program may mean one or more programs.

The memory 103 reads the program from the auxiliary storage device 102 and stores the program when the program is instructed to be activated. The CPU 104 executes the function related to the server 10 in accordance with the program stored in the memory 103. The interface device 105 is used as an interface for connecting to the network.

Figure 3:
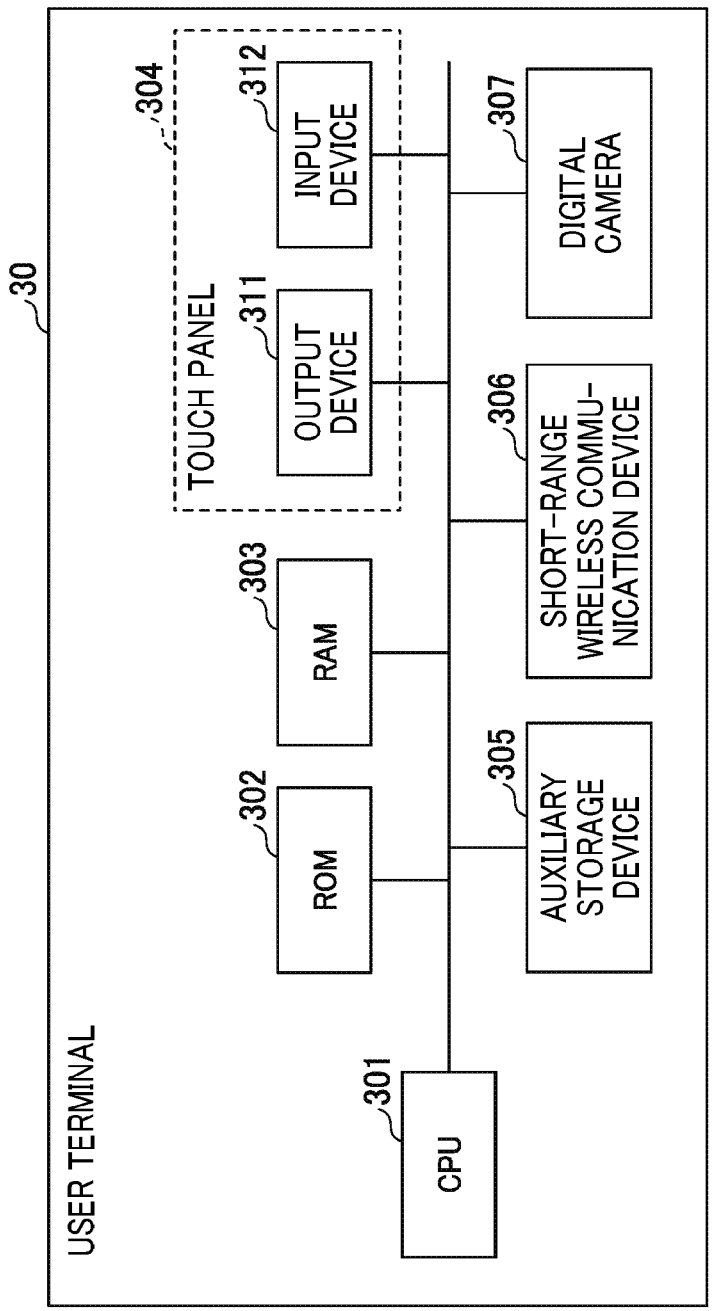
FIG. 3 is an example block diagram of a hardware configuration of a user terminal according to the first embodiment.

FIG. 3 is an example block diagram of a hardware configuration of the user terminals 30 and 40 according to the first embodiment. In the embodiment, the user terminals 30 and 40 employ the same hardware configuration. In FIG. 3, the hardware configuration of the user terminal 30 is described as an example hardware configuration of the user terminals 30 and 40. In this description, the user terminal is described as an example of terminal device used in the information processing system 1.

As indicated in FIG. 3, the user terminal 30 includes, for example, a central processing unit (CPU) 301, a read only memory (ROM) 302, a random access memory (RAM) 303, a touch panel 304, an auxiliary storage device 305, a short-range wireless communication device 306, and a digital camera 307.

The ROM 302 and the auxiliary storage device 305 store the program installed on the user terminal 30. The RAM 303 reads the program from the ROM 302 or the auxiliary storage device 305 and stores the program when the program is instructed to be activated. The CPU 301 executes the program stored in the RAM 303 to implement functions of the user terminal 30.

The touch panel 304 is an electronic component equipped with both an input function and a display function, and performs information display and reception of input from a user. As indicated in FIG. 3, the touch panel 304 includes, for example, an output device 311 and an input device 312.

The output device 311 is, for example, a liquid crystal display, and performs a display function of the touch panel 304. The input device 312 is an electronic component including a sensor that can detect contact of a contacting object with the output device 311. The contacting object means an object that contacts a contact surface (face) of the touch panel 304. Examples of the contacting object include a user finger, a special pen, or a general pen. The touch panel 304 is not necessarily provided. The user terminal 30 may be provided with the output device 311 and the input device 312 separately. Further, the output device 311 can be connected to the user terminal 30 externally. Further, the input device 312 is not limited to a sensor for detecting contact. For example, the input device 312 includes electronic components, such as hardware keys, a keyboard, a mouse, and the like.

The short-range wireless communication device 306 is a hardware resource used for performing short-range wireless communication. In the first embodiment, the short-range wireless communication device 306 reads information stored in a near field communication (NFC) tag. That is, in the first embodiment, an NFC reader can be used as the short-range wireless communication device 306. The digital camera 307 can be a general digital camera having an imaging function. The digital camera 307 can be disposed as an electronic component inside the user terminal 30, or the digital camera 307 can be disposed outside of the user terminal 30 and connected to the user terminal 30.

The user terminals 30 and 40 need not include, for example, the touch panel 304, the digital camera 307, or the short-range wireless communication device 306. The output device 311 of the user terminals 30 and 40 may be a display, and the input device 312 of the user terminals 30 and 40 may be a keyboard or a pointing device.

Figure 4:
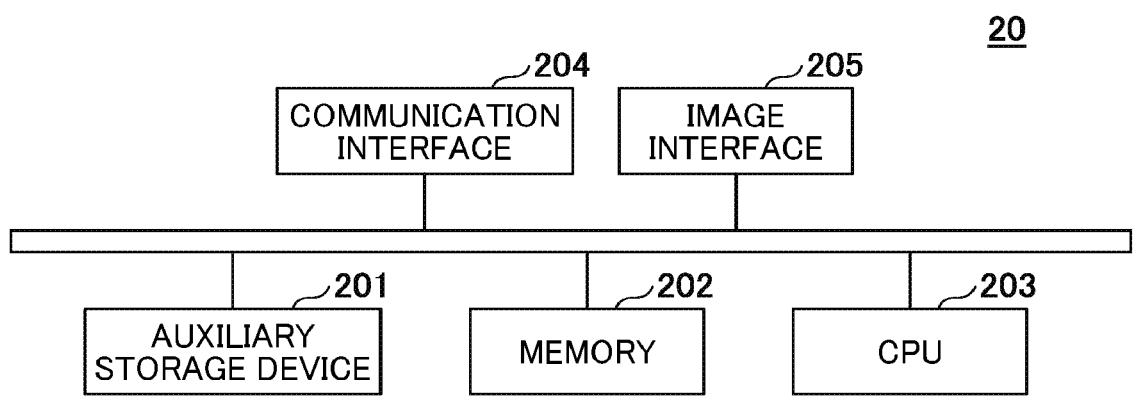
FIG. 4 is an example block diagram of a hardware configuration of an intermediary apparatus according to the first embodiment.

FIG. 4 is an example block diagram of a hardware configuration of the intermediary apparatus 20 according to the first embodiment. As indicated in FIG. 4, the intermediary apparatus 20 includes, for example, an auxiliary storage device 201, a memory 202, a CPU 203, a communication interface 204, and an image interface 205.

One or more programs for implementing various processing in the intermediary apparatus 20 is installed on the auxiliary storage device 201. Hereinafter, the program may mean one or more programs. The auxiliary storage device 201 stores the installed program, and necessary files and data.

The memory 202 reads the program from the auxiliary storage device 201 and stores the program when the program is instructed to activate. The CPU 203 executes the program stored in the memory 202 to implement functions of the intermediary apparatus 20. The communication interface 204 is a physical interface for connecting to the network. The image interface 205 is a physical interface for transmitting image data to the output apparatus 50.

Figure 5:
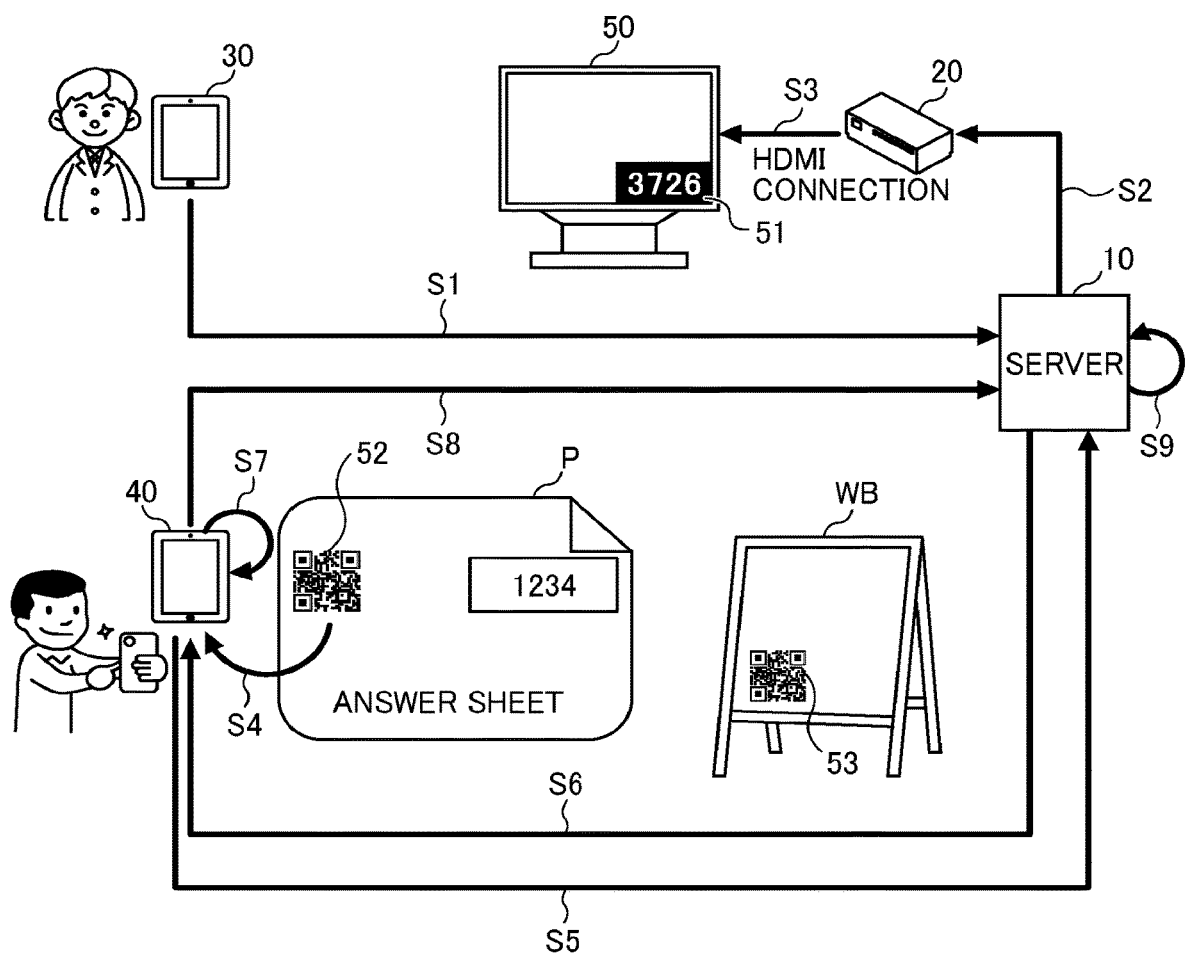
FIG. 5 is an example diagram of a scheme of an information processing system according to the first embodiment.

FIG. 5 is an example diagram of a scheme of the information processing system 1 according to the first embodiment. In FIG. 5, the information processing system 1 is used in an educational field such as a school, in which the user terminal 30 is mainly used by a teacher and the user terminal 40 is mainly used by a student. In the following description, the user terminal 30 may be also referred to as the teacher terminal 30 while the user terminal 40 may be also referred to as the student terminal 40.

Specifically, FIG. 5 indicates an example case in which a test is performed during a lecture, and image data of answer sheets of test are stored in the server 10 so that the teacher can view the image data of answer sheets. Hereinafter, a description is given of this usage.

Typically, the filled-out answer sheets are submitted to the teacher for grading the answer sheets, and then the answer sheet is returned to each student after completing the grading of the answer sheets. Therefore, if each student wants to self-evaluate contents that are filled-out in the answer sheet, he or she (each student) is required to memorize test problems and the contents filled-out in the answer sheet, which is difficult to do.

Further, if the teacher wants each student to review the test problems right after the test is ended, the teacher is required to quickly grade the answer sheets and return the graded answer sheets to each student. However, the teacher may not always be able to grade the answer sheets so quickly.

Therefore, at educational fields, it becomes necessary to take copies of answer sheets (e.g., copy or photograph) immediately after the test was performed. However, it is extremely difficult for the teacher to take copies of all students' answer sheets, because copying of the students' answer sheets is laborious for the teacher.

Therefore, in the first embodiment, each student captures an image of the answer sheet using the student terminal 40, so that the captured image data is transmitted to a storage destination designated by the teacher in advance.

As to the information processing system 1 of the first embodiment, the teacher terminal 30 transmits a request to generate a specific information to the server 10 (step S1).

In response to receiving the request from the teacher terminal 30, the server 10 generates the specific information and transmits a request to execute a process of outputting the specific information to the intermediary apparatus 20 (step S2).

In response to receiving the process execution request from the server 10, the intermediary apparatus 20 causes the output apparatus 50 to display specific information 51 (step S3).

The output apparatus 50 is, for example, a display installed or disposed in a lecture room or the like where a lecture is given. Specifically, the output apparatus 50 may be, for example, an electronic whiteboard to display document and images to be viewed by the students and teacher.

Further, when the student terminal 40 is placed over the QR code 52 attached to an answer sheet P, the student terminal 40 activates the QR code reading function to read the QR code 52 (step S4). In the following description, the QR code 52 attached to the answer sheet may be referred to as the answer sheet QR code or answer sheet QR code 52.

The answer sheet QR code 52 can be issued by the information processing system 1 for each educational institution. Further, information specifying a storage destination of image data transmitted from the student terminal 40 is embedded in the answer sheet QR code 52.

When the student terminal 40 reads the answer sheet QR code 52, the student terminal 40 accesses the server 10 (step S5), and receives an activation instruction for activating an imaging function of the student terminal 40 from the server 10 (step S6).

When the student terminal 40 receives the instruction to activate the imaging function of the student terminal 40 from the server 10, the student terminal 40 displays an input screen for inputting the specific information 51. When the specific information 51 is input by the student, a camera function of the student terminal 40 is activated to display an image capture screen used for capturing an image of the answer sheet P.

When the student performs the image capturing operation of image of the answer sheet P by using the student terminal 40, the student terminal 40 captures an image of the answer sheet P (step S7).

Then, the student terminal 40 assigns the input specific information 51 to image data of the captured image of the answer sheet P and transmits the image data of the answer sheet P to a storage destination indicated by the answer sheet QR code 52 (step S8).

Then, the server 10 stores the image data of the answer sheet P received from the student terminal 40 in the designated or specified storage destination (step S9).

In the first embodiment, as above described, the specific information output from the server 10 based on the instruction of the teacher terminal 30 is assigned to the image data captured by the student terminal 40 and stored in the server 10, with which the image data and the specific information can be associated with each other. In other words, according to the first embodiment, the teacher who has instructed the server 10 to output the specific information and the student who has transmitted the image data can be managed or controlled in association with each other.

In the first embodiment, the student terminal 40 implements a function of transmitting the captured image data to the specified storage destination based on an instruction received from the server 10. Therefore, it is not necessary to install a dedicated application on the student terminal 40, and the pre-setting is not required, and the image data can be stored in the storage destination specified by a simple procedure.

In the first embodiment, all of the image data of the answer sheets captured by the student terminals 40 are stored in the designated storage destination automatically.

Therefore, when the first embodiment is applied, it is not necessary to take copies of the answer sheets when the teacher returns the filled-out answer sheets to the students, with which the teacher's load, such as copying of the answer sheets, can be reduced. Further, when the first embodiment is applied, the students can obtain their filled-out answer sheets right after completing the test, so that the answer sheets can be used for self-grading and review.

In FIG. 5, a target or target object to be captured by the student terminal 40 is the answer sheet P, but is not limited thereto. For example, whiteboard QR code 53 can be set on a whiteboard WB installed or disposed in a lecture room as indicated in FIG. 5. When image data is written on the whiteboard WB during the lecture, the image data can be transmitted to the storage destination designated by using the above-described processing configuration. In the following description, the whiteboard QR code 53 attached to or associated with the whiteboard WB may be referred to as the board QR code 53.

Therefore, for example, when a student uses the whiteboard WB during a lecture to make a presentation or explain answers to problems, and the board QR code 53 assigned to the whiteboard WB is read out by the student terminal 40 and an image on the whiteboard WB is captured by the student terminal 40, the image data written on the whiteboard WB can be transmitted to the specified storage destination.

The specific information 51 can be assigned as information identifying the output apparatus 50, and can consist of any information, such as numbers, characters, symbols, or figures. Further, the specific information 51 can be displayed using the output apparatus 50 as a two-dimensional code, such as a QR code (registered trademark). Further, the specific information 51 can be a beacon signal or the like, which is transmitted from the output apparatus 50 or a transmission device associated with the output apparatus 50. Further, the specific information 51 can be transmitted from the output apparatus 50 or a transmitter associated with the output apparatus 50 using wireless communication.

In the following description, the specific information (or identification information) is, for example, a passcode. As described above, the passcode is just one example of the specific information (or identification information). The details of such specific information will be described later.

Figure 6:
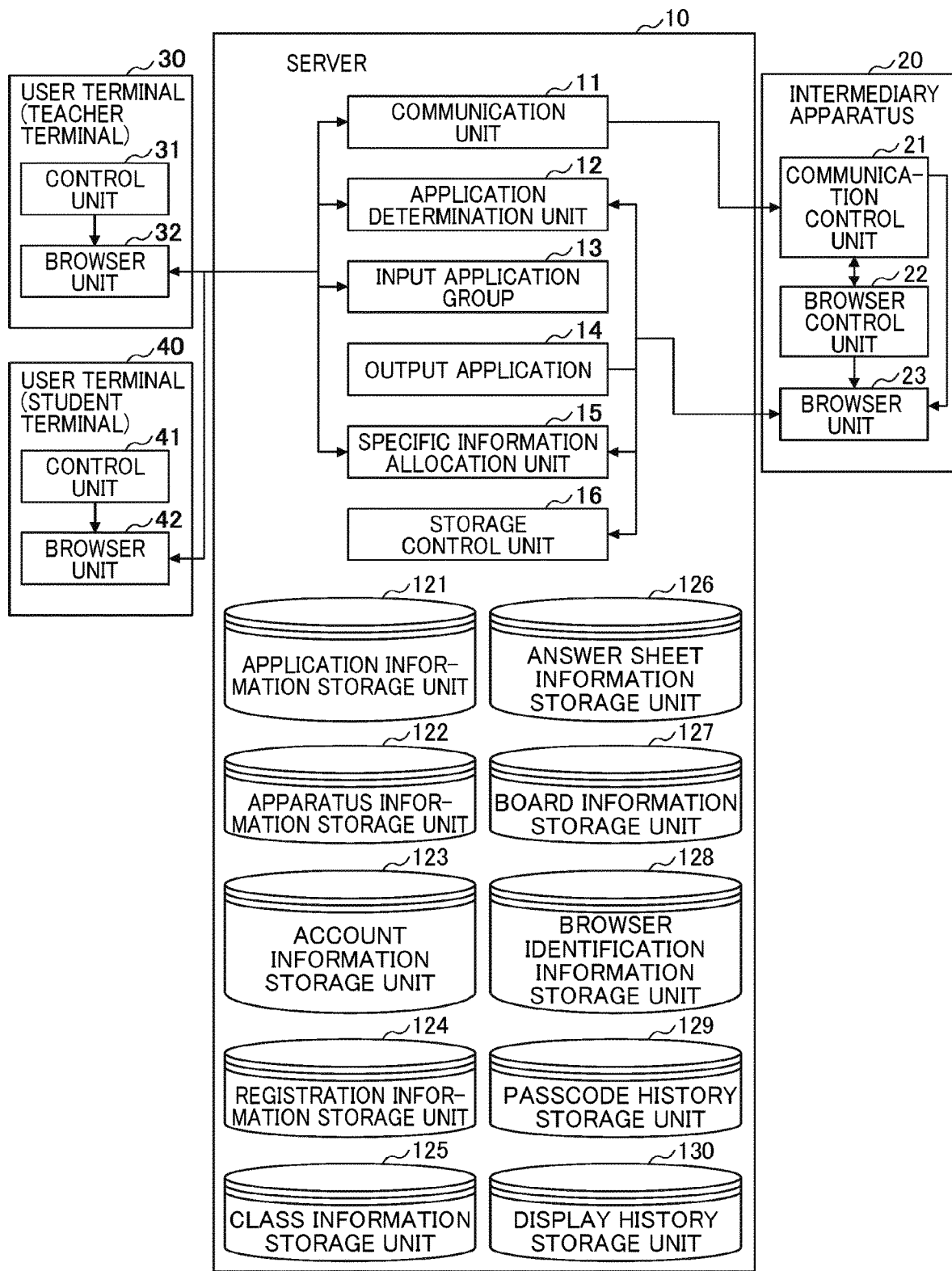
FIG. 6 is an example block diagram of a functional configuration of each apparatus or device in the information processing system according to the first embodiment.

FIG. 6 is an example block diagram of a functional configuration of each apparatus or device in the information processing system 1 according to the first embodiment. As indicated in FIG. 6, the teacher terminal 30 includes, for example, a control unit 31 (operating system unit) and a browser unit 32. These units can be implemented by executing one or more programs installed on the teacher terminal 30 using the CPU 301.

The control unit 31 activates the browser unit 32 in response to receiving a user operation to the teacher terminal 30. The browser unit 32 is, for example, a general web browser, and performs processing in accordance with hypertext markup language (HTML) data and script, such as JavaScript (registered trademark) or the like. Further, in response to the activation of the browser unit 32, the browser unit 32 transmits an initial access universal resource locator (URL) to the server 10.

At this stage, the browser unit 32 also transmits registration identification (ID), which is assigned to the initial access URL as optional information, to the server 10 along with the initial access URL. The registration ID is identification information identifying a specific service, and the registration ID is associated with a specific application that implements the specific service in advance.

Further, in accordance with a redirect request received from the server 10 that responds to the access to the initial access URL, the browser unit 32 accesses the specific application associated with the registration ID, among applications installed on the server 10. The redirect request is a response from the server 10 that responds to the access to the initial access URL.

The browser unit 32 acquires, from the accessed specific application, data (e.g., hypertext markup language (HTML) data and script) indicating a process execution request to the teacher terminal 30.

The initial access URL indicates a URL to be accessed at first when the teacher terminal 30 accesses the server 10.

As indicated in FIG. 6, the student terminal 40 includes, for example, a control unit 41 (operating system unit) and a browser unit 42. These units can be implemented by executing one or more programs installed on the student terminal 40 using the CPU 301 (FIG. 3) of the student terminal 40.

The control unit 41 activates the browser unit 42 in response to receiving a user operation to the student terminal 40. The browser unit 42 is, for example, a general web browser, and performs a process of displaying various screen images.

As indicated in FIG. 6, the intermediary apparatus 20 includes, for example, a communication control unit 21, a browser control unit 22, and a browser unit 23. These units can be implemented by executing one or more programs installed on the intermediary apparatus 20 using the CPU 203.

The communication control unit 21 connects a bi-directional communication path with the communication unit 11 of the server 10 (i.e., establishing a communication session), and functions as an endpoint of the intermediary apparatus 20 on the communication path (communication session). By performing the communication via the communication path (communication session), the state of the intermediary apparatus 20 can be reported or notified to the server 10, and the intermediary apparatus 20 can receive a notification that the image data to be displayed using the output apparatus 50 has been input to the server 10, from the server 10. The input of image data to the server 10 indicates that the image data is uploaded to the server 10 from the teacher terminal 30 or the student terminal 40.

The browser control unit 22 activates the browser unit 23 using, for example, a kiosk mode. The kiosk mode is a mode that restricts the usage of the intermediary apparatus 20 to displaying of web pages alone. The kiosk mode is just one example. Any mode that can display web pages can be used.

The browser unit 23 is, for example, a general web browser, and performs processing in accordance with hypertext markup language (HTML) data and script.

The browser unit 23 accesses the initial access URL in response to the activation. At this stage, in the server 10, the identification information of the browser unit 23 (hereinafter, "browser ID") is assigned to the initial access URL as optional information.

Further, in accordance with a redirect request received from the server 10, which is transmitted from the server 10 in response to the access to the initial access URL, the browser unit 23 accesses a specific application associated with the browser ID, among applications installed on the server 10. Then, the browser unit 23 acquires data (e.g., HTML data, script) indicating a process execution request to the intermediary apparatus 20 from the specific application.

As indicated in FIG. 6, the server 10 includes, for example, a communication unit 11, an application determination unit 12, an input application group 13, an output application 14, a specific information allocation unit 15, and a storage control unit 16. These units can be implemented by executing one or more programs installed on the server 10 using the CPU 104.

Further, as indicated in FIG. 6, the server 10 includes an application information storage unit 121, an apparatus information storage unit 122, an account information storage unit 123, a registration information storage unit 124, a class information storage unit 125, an answer sheet information storage unit 126, a board information storage unit 127, a browser identification information storage unit 128, a passcode history storage unit 129, and a display history storage unit 130. Each of these storage units can be implemented by, for example, the auxiliary storage device 102 or a storage device that can be connected to the server 10 via a network.

The communication unit 11 performs processing to establish communication between the server 10 and the intermediary apparatus 20, and performs communication between the server 10 and the teacher terminal 30 or the student terminal 40. In other words, the communication unit 11 is an example of a transmitting unit for transmitting information and a receiving unit for receiving information in the server 10.

The application determination unit 12 corresponds to the initial access URL. In response to the access to the initial access URL, the application determination unit 12 refers to the registration information storage unit 124 to identify a specific application corresponding to the optional information (e.g., registration ID or browser ID) assigned to the initial access URL.

After identifying the specific application corresponding to the optional information, the application determination unit 12 transmits a response including a redirect request including a URL of the identified specific application to an access requesting source that has accessed the initial access URL of the server 10.

The input application group 13 and the output application 14 are an example of applications installed on the server 10.

The input application group 13 is an application group including applications used for executing processing corresponding to respective specific usages, and each application transmits HTML data and script to execute processing corresponding to the specific usage, to the teacher terminal 30.

The input application group 13 includes, for example, a teacher portal application to cause the teacher terminal 30 to execute a process of displaying a menu of a portal screen used by a teacher, and an attendance display application that displays the status of attendance of each student to the teacher terminal 30.

Further, the input application group 13 includes a camera application (hereinafter, camera application). The camera application is an application that activates a camera function of the student terminal 40, and transmits image data captured by the camera to the server 10 when the answer sheet QR or board QR code are read. Further, the input application group 13 includes a schedule application to cause the teacher terminal 30 display a subject input screen used for receiving an input of subject.

The output application 14 includes an application for outputting a passcode generated by the specific information allocation unit 15. Specifically, the output application 14 can be, for example, HTML data and script causing the intermediary apparatus 20 to execute a rendering of passcode. Further, the output application 14 can be an application to cause the output apparatus 50 to transmit the passcode using wireless communication, or to cause the output apparatus 50 or a transmission device associated with the output apparatus 50 to transmit a beacon signal.

Further, the output application 14 includes an application for causing the intermediary apparatus 20 to execute acquisition (downloading) and rendering of image data stored in the answer sheet information storage unit 126 and the board information storage unit 127. Specifically, the output application 14 transmits HTML data and script for causing the intermediary apparatus 20 to execute acquisition and rendering of the concerned image data, to the intermediary apparatus 20.

The specific information allocation unit 15 generates a passcode, and causes the output apparatus 50 to display the passcode via the intermediary apparatus 20. The specific information allocation unit 15 generates the passcode in a way such that each of passcodes displayed using the output apparatus 50 becomes different from each other. The generation of passcode by the specific information allocation unit 15 will be described later.

The storage control unit 16 stores the image data uploaded to the server 10 by the input application group 13, and the passcode output from the output apparatus 50 via the intermediary apparatus 20 by the output application 14 into each storage unit. The details of the storage control unit 16 will be described later.

The application information storage unit 121 stores information (e.g., URL) related to each application installed on the server 10. In the embodiment, the application information storage unit 121 stores information (e.g., URL) related to each application installed on the server 10, such as the input application group 13 and the output application 14.

The account information storage unit 123 stores identification information of one or more users who can use each application installed on the server 10.

The apparatus information storage unit 122 stores information indicating the state of the intermediary apparatus 20 for each one of the intermediary apparatuses 20 disposed in the user environment E1.

The registration information storage unit 124 stores identification information identifying a specific application, which executes the input processing of image data, identification information identifying a specific application, which executes the output processing of image data, and identification information identifying the browser unit 23 of the intermediary apparatus 20 used as the output destination of image data, for each of the registration IDs.

The class information storage unit 125 stores information on each class, such as lecture. Specifically, the class information storage unit 125 stores lecture type, lecture room, lecture time, information specifying or identifying each teacher, information specifying or identifying image data captured during each lecture, and the like.

The answer sheet information storage unit 126 and the board information storage unit 127 are examples of image data storage units where the image data is stored. The image data storage unit can be implemented by a memory.

The answer sheet information storage unit 126 stores, for example, image data of the answer sheet captured by the student terminal 40. The board information storage unit 127 stores, for example, image data written on a board, such as blackboard and whiteboard, installed or disposed in a lecture room or the like.

Each of the answer sheet information storage unit 126 and the board information storage unit 127 stores the passcode assigned to the image data stored in each of the answer sheet information storage unit 126 and the board information storage unit 127, and information identifying each student who has captured the image data, with the image data.

The browser identification information storage unit 128 stores information indicating a browser identification (ID) used for displaying a passcode during a lecture.

The passcode history storage unit 129 stores information indicating a history of passcode previously output via the output application 14. The display history storage unit 130 stores information indicating a history of image data previously displayed using the output apparatus 50 by the browser unit 23 of the intermediary apparatus 20.

The details of each storage unit described above will be described later.

Figure 7:
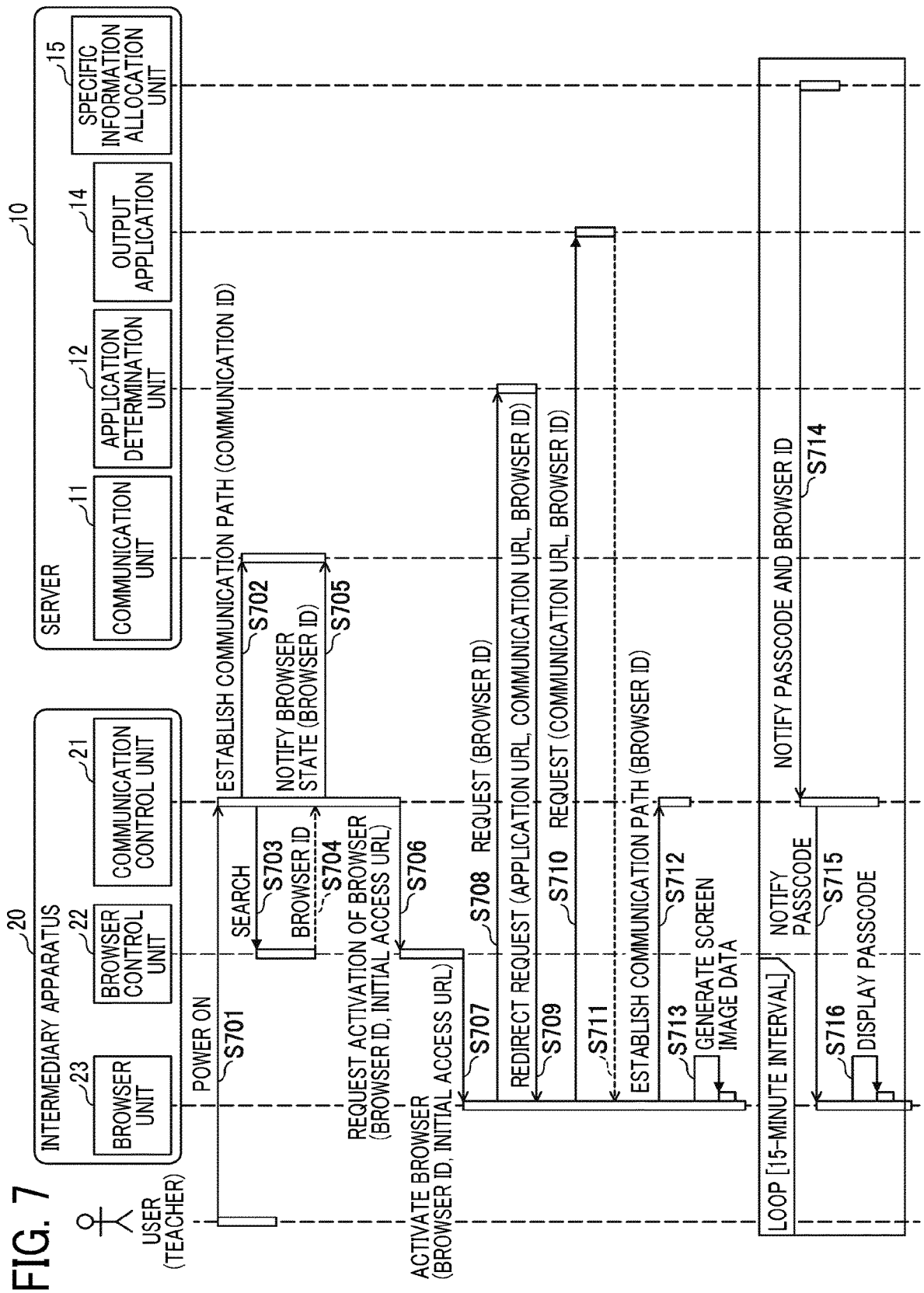
FIG. 7 is an example sequence diagram of processing, which is performed in response to an activation of the intermediary apparatus according to the first embodiment.

Hereinafter, a description is given of processing performable in the information processing system 1 with reference to FIG. 7. FIG. 7 is an example sequence diagram of processing, which is performed in response to an activation of the intermediary apparatus 20. Specifically, FIG. 7 indicates a sequence until a passcode is displayed on the output apparatus 50.

When a user turns on the power supply to the intermediary apparatus 20 (step S701), the communication control unit 21 of the intermediary apparatus 20 establishes a communication path with the communication unit 11 of the server 10 to receive a request from the communication unit 11 of the server 10 asynchronously (step S702). At this stage, the communication control unit 21 reports or notifies a communication ID, which is the identification information of the communication control unit 21, to the communication unit 11. Then, the communication unit 11 updates the apparatus information storage unit 122 based on the communication ID (hereinafter, "target communication ID") reported or notified from the communication control unit 21.

FIG. 8 is an example of information stored in the apparatus information storage unit 122. As indicated in FIG. 8, the apparatus information storage unit 122 stores information items, such as, tenant ID, communication ID, address information, state information, browser ID, browser state, and passcode in association with each other.

The tenant ID represents identification information of a subscriber (e.g., tenant) having a service-use contract provided by the server 10. For example, the user environment E1 can be one tenant.

The communication ID represents identification information of the communication control unit 21 of each intermediary apparatus 20 disposed in the tenant identified or specified by the tenant ID. If the intermediary apparatus 20 includes only one communication control unit 21, the communication ID can be used as the identification information identifying the intermediary apparatus 20.

The address information represents a local internet protocol (IP) address of the intermediary apparatus 20.

The state information represents information indicating whether or not the communication control unit 21, identified or specified by the communication ID, is connected to the server 10, such as whether the communication control unit 21 has established the communication path with the server 10 ("connected") or not ("not connected").

The browser ID represents identification information identifying the browser unit 23 corresponding to the communication control unit 21 identified or specified by the communication ID. In this description, the browser ID represents identification information identifying the browser unit 23 included in the same intermediary apparatus 20 including the communication control unit 21 identified or specified by the communication ID.

The browser state represents information indicating the activation state of the browser unit 23 identified or specified by the browser ID. For example, if the target communication ID reported or notified to the communication unit 11 is "Eg001-01," the browser state corresponding to the target communication ID in the apparatus information storage unit 122 is changed to "power ON" as indicated in FIG. 8.

The passcode is generated by the specific information allocation unit 15 when the communication path with the intermediary apparatus 20 is established, and the generated passcode is associated with the browser ID (the intermediary apparatus 20). If a plurality of browser IDs is associated with the communication ID, the passcode can be generated for each of the browser IDs.

After step S702, the communication control unit 21 searches the browser control unit 22 to obtain or acquire the browser ID using, for example, simple network management protocol (SNMP) (step S703).

Then, the communication control unit 21 obtains or acquires the browser ID, which is the identification information identifying the browser unit 23 to be controlled by the browser control unit 22, from the searched browser control unit 22 (step S704).

In the first embodiment, the intermediary apparatus 20 includes the communication control unit 21 and the browser control unit 22. In this configuration, the communication control unit 21 included in one intermediary apparatus 20 searches the browser control unit 22 using the simple network management protocol (SNMP) to enable the communication control unit 21 included in one intermediary apparatus 20 to communicate with the browser control unit 22 included in another intermediary apparatus 20 via the same network so that a plurality of the browser control units 22 and the browser units 23 can be used. Therefore, the searching of the browser control unit 22 is not necessarily required, but the acquiring destination (browser control unit 22) for which the communication control unit 21 is to acquire the browser ID can be pre-set in advance.

After step S704, the communication control unit 21 transmits, to the communication unit 11, a notification that the state of the browser unit 23 corresponding to the acquired browser ID (e.g., the browser unit 23 of the intermediary apparatus 20) becomes ready for use by designating the browser ID (hereinafter, "target browser ID") of the browser unit 23 (step S705).

In response to receiving the notification from the communication control unit 21 (step S705), the communication unit 11 updates the apparatus information storage unit 122 (FIG. 8) based on the target browser ID designated in the notification. Specifically, a value of the browser state corresponding to the target browser ID is updated from "power OFF" to "power ON" in the apparatus information storage unit 122.

Then, the communication control unit 21 designates the target browser ID and the initial access URL to request the browser control unit 22 to activate the browser unit 23 identified or specified by the target browser ID (step S706). As described above, the initial access URL corresponds to the URL to be accessed by the browser unit 23 at first, and is pre-set in the browser control unit 22 in advance.

In response to receiving the request from the communication control unit 21 (step S706), the browser control unit 22 activates the browser unit 23 identified or specified by the target browser ID using the kiosk mode (step S707). At this stage, the browser control unit 22 inputs the initial access URL to the browser unit 23.

Then, in response to activating the browser unit 23 using the kiosk mode (step S707), the browser unit 23 transmits an HTTP request to the input initial access URL, which is the application determination unit 12 of the server 10 (step S708). The HTTP request includes the target browser ID.

In response to receiving the HTTP request from the browser unit 23 (step S708), the application determination unit 12 of the server 10 transmits a response (HTTP response) including a redirect request to the browser unit 23 (step S709).

The redirect request includes a URL of application (application URL) associated with the browser ID as a redirect destination. The redirect request further includes a communication URL and the target browser ID included in the HTTP request, as the notification information to the redirect destination. The communication URL corresponds to the URL of the communication control unit 21.

At this stage, the application determination unit 12 refers to the registration information storage unit 124 (FIG. 9) and the application information storage unit 121 (FIG. 10) to identify or specify a URL of a specific application associated with the target browser ID.

FIG. 9 is an example of information stored in the registration information storage unit 124. As indicated in FIG. 9, the registration information storage unit 124 stores information items, such as, registration ID, In-application ID, Out-application ID, and browser ID, in which value of "registration ID" is associated and stored with values of other information items.

The In-application ID is an ID of an application (hereinafter, "application ID") that controls the input of image data for a specific service corresponding to the registration ID.

The Out-application ID is an application ID of an application that controls the output of image data for a specific service corresponding to the registration ID.

In the first embodiment, an application indicated by the In-application ID associated with the registration ID in the registration information storage unit 124 indicates one of applications included in the input application group 13. Further, an application indicated by the Out-application ID associated with the registration ID in the registration information storage unit 124 indicates the output application 14.

For example, the registration ID of "Tag_Ed" is associated with the In-application ID of "AP_EdPortal" but not associated with the Out-application ID as indicated in FIG. 9. Therefore, it can be understood that a service corresponding to the registration ID of "Tag_Ed" provides a service of controlling the input of image data. The In-application ID of "AP_EdPortal" indicates an application ID of an application that executes processing to display a menu of a portal screen for a teacher, among the applications included in the input application group 13.

Further, the registration ID of "Tag_St" is associated with the In-application ID of "AP_Stcamera" but not associated with the Out-application ID as indicated in FIG. 9,. Therefore, it can be understood that a service corresponding to the registration ID of "Tag_St" provides a service of controlling the input of image data. In other words, in a case of the student terminal 40 provided with the service corresponding to the registration ID of "Tag_St" alone, the student terminal 40 does not have a function of transmitting the process execution request to the intermediary apparatus 20, to the server 10.

The In application ID of "AP_Stcamera" indicates an application ID of an application that activates the camera of the student terminal 40, and transmits the image data captured by the camera of the student terminal 40 to the storage destination, among the applications included in the input application group 13.

Further, in an example case of FIG. 9, the registration ID of "Tag_StPhotoCode" is associated with the In-application ID of "AP_StPhoto" and the Out-application ID of "AP_PhotoDoc" but not associated with the browser ID.

In the first embodiment, the registration ID, the In-application ID and the Out-application ID are associated with each other as above described. In a state in which the browser ID is not associated with the registration ID, the In-application ID and the Out-application ID, a service is determined without determining the browser ID. In such a case, the service and the browser ID are associated with each other based on the passcode.

In the following description, in the registration information storage unit 124, information including the value of "registration ID" and the values of the other information items is referred to as "tag information."

FIG. 10 is an example of information stored in the application information storage unit 121. As indicated in FIG. 10, the application information storage unit 121 stores information items, such as, application ID, application type, URL, and corresponding browser for each application installed on the server 10.

The application type represents a type of an application identified or specified by the application ID based on a relationship with image data. "In" indicates that the application type is an application that controls the input of image data (corresponding to the above-described In-application ID). "Out" indicates that the application type is an application that controls the output of image data (corresponding to the above-described Out-application ID). The URL corresponds to the URL of the application identified or specified by the application ID.

The corresponding browser indicates a type of browser that activates the application identified or specified by the application ID. In an example case of FIG. 10, the browser type includes a terminal-use browser indicating a browser unit of the teacher terminal 30 and the student terminal 40, and an apparatus-use browser indicating the browser unit 23 of the intermediary apparatus 20.

The application determination unit 12 refers to the registration information storage unit 124 (FIG. 9) to identify or specify an Out-application ID associated with the target browser ID, and then refers to the application information storage unit 121 (FIG. 10) to identify or specify a URL associated with the Out-application ID. In this example case, it is assumed that the target browser ID is "BROWSER1," in which a URL (hereinafter, output application URL) of an application (i.e., output application 14) having the application ID of "AP_PhotoDoc" is identified.

Further, the application determination unit 12 automatically generates the communication URL of the communication control unit 21 identified or specified by the target communication ID based on the address information associated with the target browser ID stored in the apparatus information storage unit 122 (FIG. 8).

Then, referring again to FIG. 7, in accordance with the redirect request (step S709), the browser unit 23 transmits (redirects) an HTTP request to the output application URL used as the redirect destination that is the output application 14 (step S710). The HTTP request includes the communication URL and the browser ID included in the redirect request.

In response to receiving the HTTP request from the browser unit 23 (step S710), the output application 14 transmits a response including a script and display data to the browser unit 23 (step S711), in which the script is used to cause the browser unit 23 to connect with the communication URL included in the HTTP request, and the display data is used to cause the browser unit 23 to render a user interface used for displaying a passcode. The script and display data are examples of data indicating the request for executing the processing to the intermediary apparatus 20. For example, the script can be another type of program, and the display data can be another type of data.

In response to receiving the response from the output application 14 (step S711), the browser unit 23 executes the script included in the response to establish a communication path with the communication control unit 21 identified by the communication URL (step S712). The communication path is used for transmitting the notification, received by the communication control unit 21 from the server 10, to the browser unit 23. The communication path can use, for example, websocket.

Then, the browser unit 23 generates or renders screen image data (hereinafter, "display screen") on a pre-set region of the memory 103 (e.g., video memory) based on the display data included in the response (step S713). For example, the display screen is a screen that displays a passcode generated at the server 10. The rendering content (i.e., display screen) generated by the browser unit 23 is output to the output apparatus 50 via an interface such as HDMI (registered trademark), and then the rendering content (i.e., display screen) can be output (displayed) using the output apparatus 50.

Then, the server 10 uses the specific information allocation unit 15 to generate and allocate passcodes that do not overlap each other for a pre-set period of time for a browser ID group associated with the tenant ID, and then distributes a passcode notification associating the browser ID and the corresponding passcode to the communication control unit 21 of the intermediary apparatus 20 at a pre-set constant interval (step S714). At this stage, the specific information allocation unit 15 stores each of the generated passcodes in the apparatus information storage unit 122 (FIG. 8) in association with each corresponding browser ID.

The pre-set period of time is, for example, a few days, and the pre-set constant interval is, for example, several minutes (e.g., 15 minutes).

In response to receiving the passcode notification (step S714), the communication control unit 21 reports or notifies the passcode to the browser unit 23 specified or identified by the browser ID associated with the passcode (step S715).

Then, the browser unit 23 displays the passcode on a portion of a display screen of the output apparatus 50 (step S716).

In an example case of FIG. 8, the communication ID of "Eg001-01" is associated with two browser IDs of "BROWSER1" and "BROWSER2." In this example case, the passcode corresponding to the browser ID of "BROWSER1" whose activation state is "power on" is displayed using the output apparatus 50 under the control of the intermediary apparatus 20.

Figure 11:
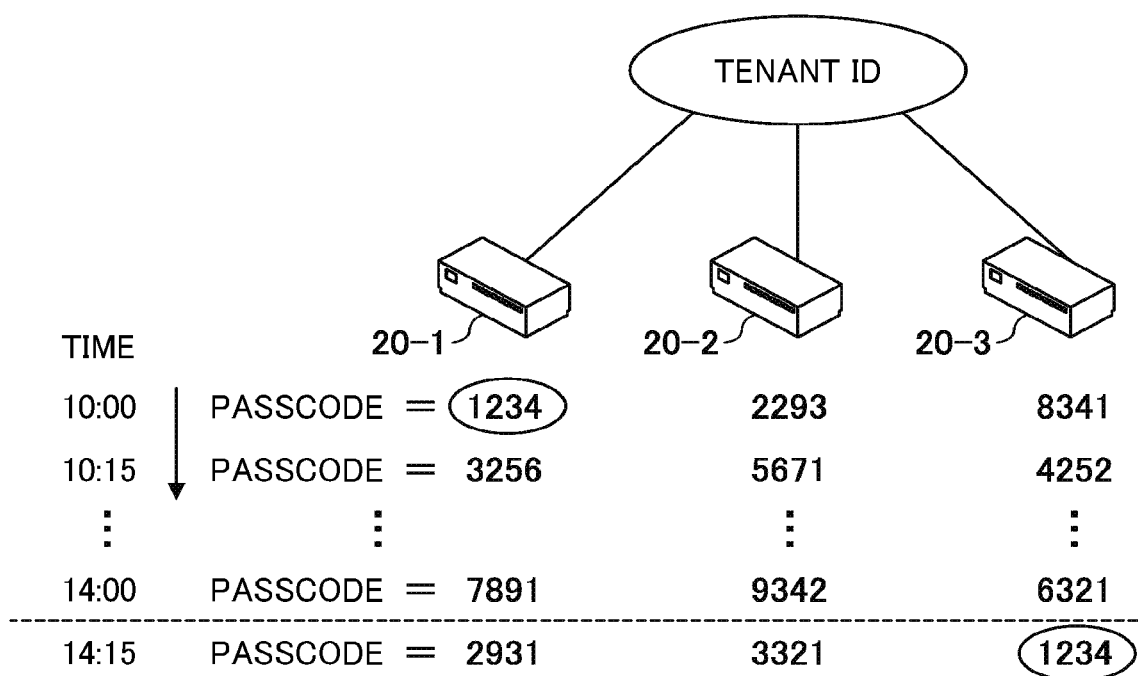
FIG. 11 is an example diagram illustrating a process of generating and allocating one or more passcodes according to the first embodiment.

Hereinafter, a description is given of generation and allocation of passcodes using the specific information allocation unit 15 with reference to FIG. 11. FIG. 11 is an example diagram illustrating a process of generating and allocating one or more passcodes.

The passcode is, for example, a string of numbers, such as a four-digit number. The specific information allocation unit 15 generates a passcode for each browser ID (intermediary apparatus 20) associated with the tenant ID. Specifically, the specific information allocation unit 15 generates randomly, for example, a random four-digit number, and allocates the generated random four-digit number to the intermediary apparatus 20 as the passcode.

Further, in a case having a plurality of the intermediary apparatuses 20 associated with one tenant ID (e.g., when a plurality of the intermediary apparatuses 20 are located in the user environment E1), the specific information allocation unit 15 generates a plurality of passcodes and allocates the generated passcodes to each one of the intermediary apparatuses 20 without allocating the same passcode to any two or more intermediary apparatuses 20. Further, the specific information allocation unit 15 periodically changes the passcode allocated to each of the intermediary apparatuses 20.

In an example case of FIG. 11, three intermediary apparatuses 20-1, 20-2 and 20-3 are located in one tenant ID.

In this example case, the specific information allocation unit 15 allocates, for example, passcodes of "1234," "2293" and "8341" to the respective intermediary apparatuses 20 (three intermediary apparatuses 20-1, 20-2 and 20-3) for 15 minutes from 10:00. Further, the specific information allocation unit 15 allocates another passcodes of "3256," "5671" and "4252" to the respective intermediary apparatuses 20 (three intermediary apparatuses 20-1, 20-2 and 20-3) for 15 minutes from 10:15.

As to the above-described configuration of the first embodiment, different passcodes can be allocated for each one of the intermediary apparatuses 20, and further, the passcode allocated to the intermediary apparatus 20 can be changed periodically. Accordingly, as to the first embodiment, the time information and the location information when the image data was captured can be specified or identified based on the passcode assigned to the image data transmitted from the student terminal 40.

Figure 12:
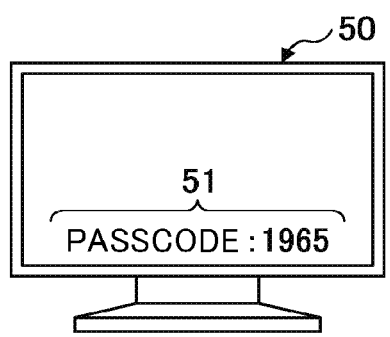
FIG. 12 is an example of a display style of passcode on an output apparatus according to the first embodiment.

FIG. 12 is an example of a display style of passcode on the output apparatus 50. As indicated in FIG. 12, a passcode 51 (specific information 51) reported or notified from the server 10 can be displayed on a display of the output apparatus 50.

Figure 13:
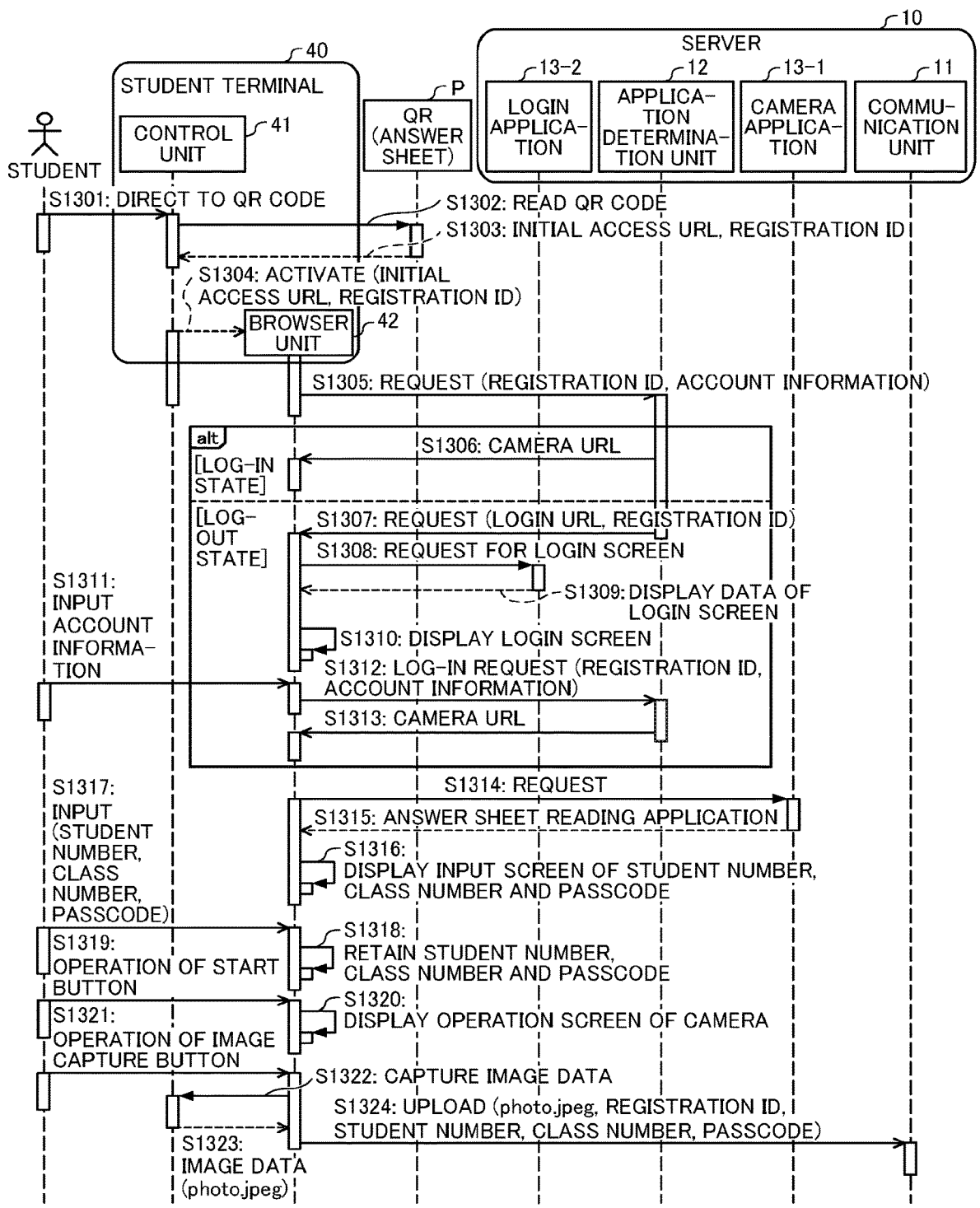
FIG. 13 is an example sequence diagram illustrating a procedure when a student terminal uploads image data to a server according to the first embodiment.

Hereinafter, a description is given of a process of uploading image data from the student terminal 40 to the server 10 with reference to FIG. 13. FIG. 13 is an example sequence diagram illustrating a procedure when the student terminal 40 uploads image data to the server 10.

At the student terminal 40, the control unit 41 detects that the student terminal 40 is directed to the answer sheet QR code by a user such as a student (step S1301).

Then, the student terminal 40 reads the answer sheet QR code (step S1302), and acquires the registration ID and the initial access URL embedded in the answer sheet QR code (step S1303).

After the student terminal 40 reads the answer sheet QR code, the student terminal 40 activates the browser unit 42 and connects to the initial access URL embedded in the answer sheet QR code (step S1304).

In response to the activation of the browser unit 42 (step S1304), the browser unit 42 automatically transmits a hypertext transfer protocol (HTTP) request to the application determination unit 12 corresponding to the initial access URL embedded in the answer sheet QR code (step S1305). The HTTP request includes account information as optional information in addition to the registration ID obtained or acquired from the answer sheet QR code.

As above described, the registration ID, which is the identification information identifying the service provided by the server 10, and the initial access URL corresponding to the application determination unit 12 are embedded in the answer sheet QR code. In other words, the answer sheet QR code is embedded with information identifying the server 10, which is the storage destination where the image data captured by the student terminal 40 is to be stored.

The account information represents information including the user ID of the student and the tenant ID of the user environment E1, or information capable of identifying or specifying the user ID and the tenant ID. For example, a cookie can be used as the account information.

If the student terminal 40 is already logged in, in response to receiving the HTTP request (step S1305), the application determination unit 12 of the server 10 transmits (redirects) the HTTP request to the browser unit 42 (step S1306). The HTTP request includes a camera URL (i.e., camera application 13-1). The camera application 13-1 is one of the applications included in the input application group 13.

In response to receiving the HTTP request (redirect) in step 1306, the browser unit 42 proceeds the sequence to step S1314, which will be described later.

Further, if the student terminal 40 is not yet logged in, in response to receiving the HTTP request (step 1305), the application determination unit 12 transmits (redirects) a HTTP request including a login URL (i.e., login application 13-2) to the browser unit 42 (step S1307).

In response to receiving the HTTP request (step S1307), the browser unit 42 transmits a request for displaying a login screen to the login application 13-2 (step S1308).

In response to receiving the display request of the login screen (step S1308), the login application 13-2 transmits display data for displaying the login screen to the browser unit 42 (step S1309).

Then, the browser unit 42 displays the login screen based on the display data (step S1310).

When the browser unit 42 receives an input of account information on the login screen (step S1311), the browser unit 42 transmits, to the server 10, a log-in request associating the registration ID, read out from the answer sheet QR code, with the input account information (step S1312).

Then, in the server 10, the application determination unit 12 refers to the account information storage unit 123 to perform a login process, and then the application determination unit 12 transmits, to the browser unit 42, a HTTP request (redirect) to the URL associated with the registration ID (step S1313). In this example case, the URL associated with the registration ID is the camera URL (i.e., camera application 13-1).

Hereinafter, a description is given of the account information storage unit 123 with reference to FIG. 14. FIG. 14 is an example configuration of the account information storage unit 123 according to the first embodiment.

The account information storage unit 123 stores information items, such as tenant ID, user ID, and password.

In the first embodiment, as to the students, a common user ID is allocated to all of the students while the user ID is allocated to each teacher. The password is determined according to each user ID.

Referring again to FIG. 13, in response to receiving the HTTP request including the camera URL (step S1313), the browser unit 42 connects to the camera application 13-1 (step S1314).

Then, the camera application 13-1 transmits, to the browser unit 42, a response including display data of an input screen used for inputting a class number, and a script for causing a process of transmitting the class number input to the input screen and the captured image data to the server 10 (step S1315).

In other words, the server 10 uses the camera application 13-1 associated with the registration ID received from the student terminal 40, to transmit, to the student terminal 40, a process execution request to implement a service of activating an imaging function of the student terminal 40, and causing the student terminal 40 to upload the image data captured by using the imaging function to the server 10. In other words, the browser unit 42 acquires, from the camera application 13-1, an answer sheet reading application, such as a script for causing process of transmitting the input class number and the captured image data to the server 10.

Then, the browser unit 42 activates the answer sheet reading application to display the input screen used for inputting the student number, class number and passcode (step S1316).

In response to receiving an input of the student number, class number and passcode on the input screen by the student (step S1317), the browser unit 42 maintains or retains the input student number, class number and passcode (step S1318).

Then, in response to receiving an operation of a start button for capturing an image of the answer sheet by the student (step S1319), the browser unit 42 displays a camera operation screen of the student terminal 40 (step S1320).

In response to receiving an operation of an image capture button (step S1321), the browser unit 42 instructs the control unit 41 to capture image data (step S1322).

Then, the control unit 41 transfers the image data captured by the camera to the browser unit 42 (step S1323).

Then, the browser unit 42 assigns the registration ID, the student number, the class number and the passcode to the image data, and transmits the image data to the communication unit 11 of the server 10 (step S1324).

Then, the image data received by the communication unit 11 is stored in the answer sheet information storage unit 126 by the storage control unit 16.

Figure 15A:
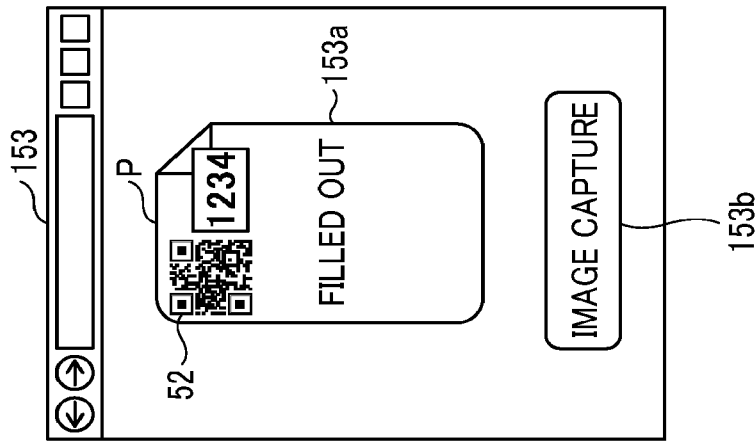
FIGS. 15A, 15B, and 15C are examples of screen displayed on a student terminal according to the first embodiment.
Figure 15B:
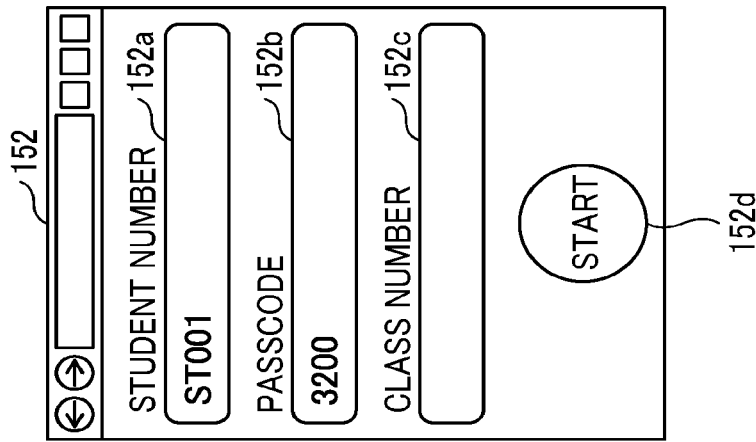
Figure 15C:
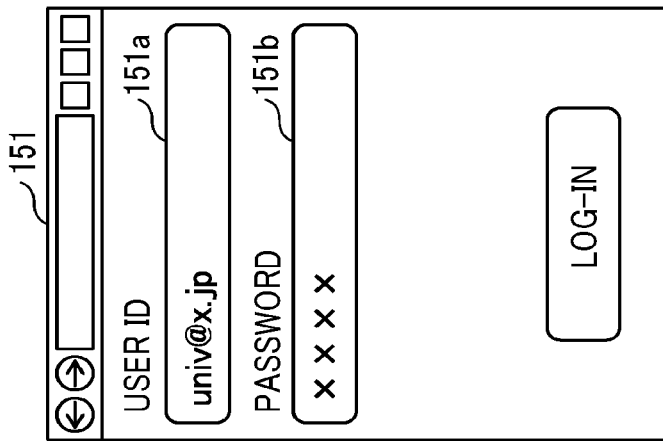

Hereinafter, a description is given of examples of display on the student terminal 40 with reference to FIGS. 15A-15C. FIGS. 15A, 15B, and 15C are examples of screen displayed on the student terminal 40 according to the first embodiment. FIG. 15A indicates an example of a login screen displayed in step S1310 of FIG. 13. FIG. 15B indicates an example of an input screen displayed in step S1316 of FIG. 13. FIG. 15C indicates an example of a camera operation screen displayed in step S1320 of FIG. 13.

In FIG. 15A, a screen 151 displays an input field 151a to input a user ID and an input field 151b to input a password.

In the first embodiment, the user ID and password input at the student terminal 40 are set as the common for each tenant ID, but is not limited to thereto. The user ID and password can be set by each student who is the user of the student terminal 40. In this case, the account information storage unit 123 stores the user ID and password of each student as the account information.

In FIG. 15B, a screen 152 displays an input field 152a to input a student number, an input field 152b to input a passcode, and an input field 152c to input a class number or lecture number. The student number is, for example, a number given for each student. The student number can be determined, for example, for each lecture that the student attends. In this case, for example, the student number can be assigned in accordance with the order in which students entered a lecture room where a lecture is given.

In the first embodiment, if the user ID is given to each student, the user ID and the student number are associated with each other, so that the input of the student number on the screen 152 is not required. Therefore, in this case, the input field 152a is not required.

The class number (lecture number) is, for example, the name or title of a lecture to be attended by the student. In a case in which the class number is embedded in the answer sheet QR code 52, the input field 152*c* is not displayed on the screen 152. The passcode is entered or input by the student by visually viewing the passcode displayed on the output apparatus 50.

Further, the inputting of class number and passcode may be required only when an image of the answer sheet is captured. If an image of the whiteboard WB alone is captured, the inputting of class number and passcode may not be required.

If a start button 152*d* is operated on the screen 152 (FIG. 15B), the browser unit 42 of the student terminal 40 shifts the screen display to an image capture screen. In other words, the start button 152*d* is an operation button for shifting the display of the student terminal 40 to the image capture screen.

In FIG. 15C, a screen 153 displays a state that the camera is being activated, and an image 153*a* of the filled-out answer sheet P is displayed, which is an example of the image capture screen. If an operation button 153*b* is operated on the screen 153, the image 153*a* of the answer sheet P is transmitted to a storage destination indicated by the answer sheet QR code.

Figure 16:
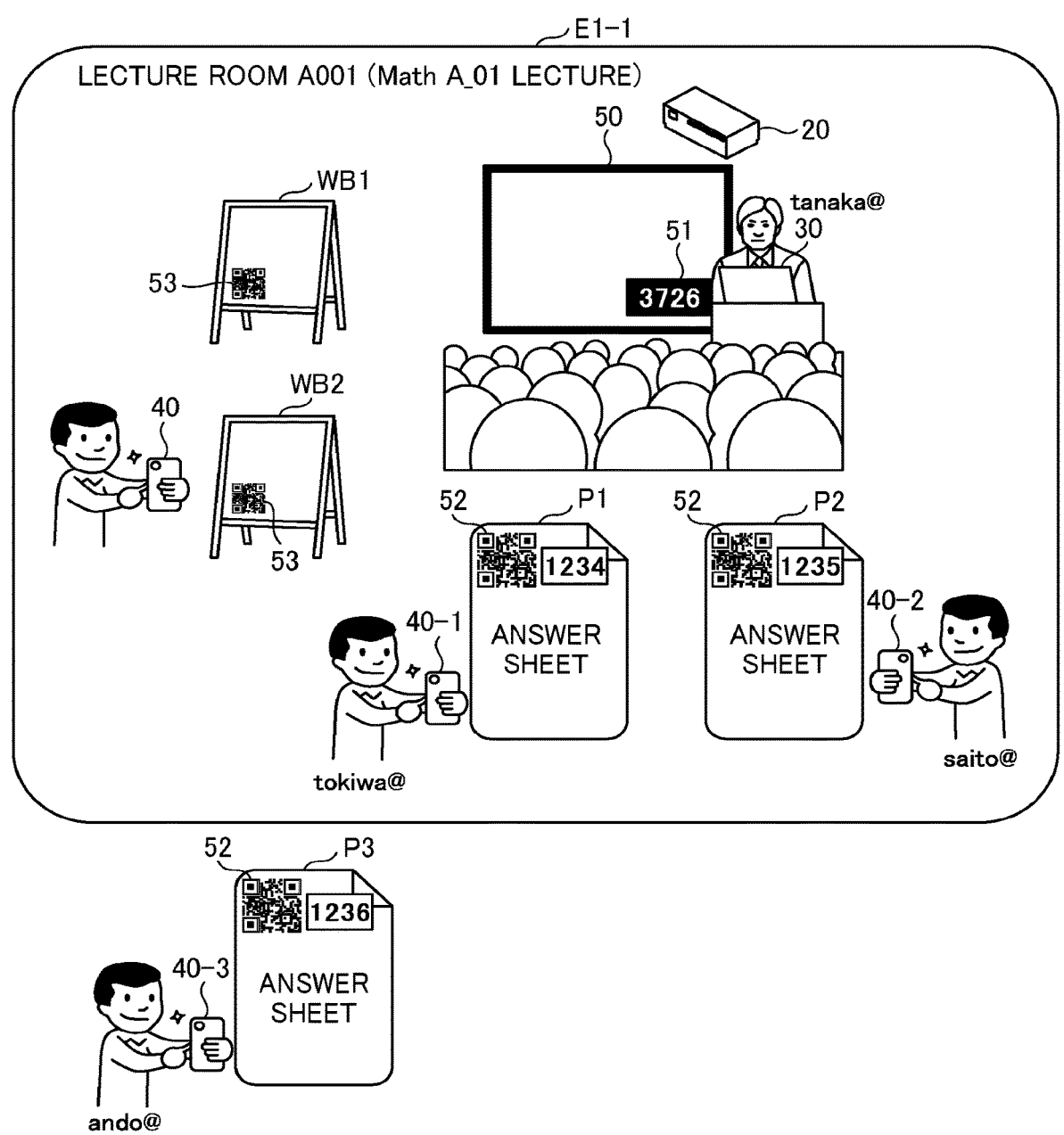
FIG. 16 illustrates a usage of the information processing system according to the first embodiment.

Hereinafter, a description is given of processing of the storage control unit 16 of the server 10 with reference to FIG. 16. Specifically, a description is given of a usage of the information processing system 1 when the storage control unit 16 is to store data. FIG. 16 illustrates a usage of the information processing system 1 according to the first embodiment.

The user environment E1-1 indicates an educational field where the information processing system 1 is used. In a lecture room A001 used as the user environment E1-1, the output apparatus 50, the whiteboards WB1 and WB2 are disposed, and a lecture titled "Math A_01" is given by a teacher who is a user of the teacher terminal 30.

The user ID of the teacher set for the lecture titled "Math A_01" is "tanaka@." In the example case of FIG. 16, the user ID is given to each student, and a first student having a first user ID of "tokiwa@" who uses a first student terminal 40-1, a second student having a second user ID of "saito@" who uses a second student terminal 40-2, and a third student having a third user ID of "ando@" who uses a third student terminal 40-3 have attended the lecture titled "Math A_01." Further, other students have attended the lecture titled "Math A_01."

In an example case of FIG. 16, a request for displaying the passcode is transmitted from the teacher terminal 30 to the server 10, and the passcode 51 is displayed on the output apparatus 50 via the intermediary apparatus 20.

In the following description, in the lecture titled "Math A_01," for example, answer sheets are distributed to the students present in the lecture room at the beginning of the lecture, and the presentation using whiteboards WB1 and WB2 and the test are given.

The answer sheet is attached with the answer sheet QR code 52 embedded with the registration ID, which is associated with the camera application 13-1 included in the input application group 13, and the URL corresponding to the application determination unit 12. Each of the whiteboards WB1 and WB2 is attached with the board QR code 53.

Further, the answer sheet QR code 52 is embedded with information indicating that the QR code corresponds to the answer sheet, and the board QR code 53 is embedded with information indicating that the QR code corresponds to the whiteboard WB.

For example, the board QR code 53 may be embedded with a registration ID identifying an application used for storing the image data in association with the user ID of the teacher when the image of the whiteboard WB is captured using any one of the student terminal.

In an example case of FIG. 16, it is assumed that the teacher requests the submission of the image data of the whiteboards WB1 and WB2 on which the contents of the presentation are written, and the teacher requests the students, to whom answer sheets are distributed, to submit the image data of the filled-out answer sheets, and further requests the students to submit the respective image data within the lecture time.

The first student who uses the first student terminal 40-1 and the second student who uses the second student terminal 40-2, attending the lecture, respectively hold the first student terminal 40-1 and the second student terminal 40-2 over the answer sheet QR code 52 attached to the answer sheets P1 and P2.

After each of the first student terminal 40-1 and the second student terminal 40-2 reads out the answer sheet QR code 52, each of the first student terminal 40-1 and the second student terminal 40-2 activates the camera function in accordance with the sequence described in FIG. 13. After inputting the account information of each student and the passcode 51 at the first student terminal 40-1 and the second student terminal 40-2, and then the image capture operation is performed by each student using the first student terminal 40-1 and the second student terminal 40-2, each of the first student terminal 40-1 and the second student terminal 40-2 captures the image of the answer sheets P-1 and P-2, respectively, and transmit the captured image data to the server 10.

Further, the student who have performed presentations using the whiteboards WB1 and WB2 holds the student terminal 40 over the board QR code 53 attached to each of the whiteboards WB1 and the WB2. When the student terminal 40 reads out the board QR code 53, the student terminal 40 activates the camera function in accordance with the sequence described in FIG. 13. In response to receiving the image capture operation, images of the whiteboards WB1 and the WB2 are captured by the student terminal 40, and the captured image data is transmitted to the server 10.

In the first embodiment, when the image data of the whiteboard WB is uploaded, the passcode may not be input.

Further, it is assumed that the third student who uses the third student terminal 40-3 and obtains an answer sheet leaves the lecture room A001 after obtaining the answer sheet. Then, after filling out the answer sheet in another location, the third student holds the third student terminal 40-3 over the answer sheet QR code 52.

In this case, since the third student who uses the third student terminal 40-3 cannot see or view the passcode displayed on the output apparatus 50, it is assumed that the image data of the filled-out answer sheet P3 is transmitted to the server 10 without inputting the passcode Hereinafter, a description is given of storing of image data using the storage control unit 16 of the server 10 with reference to FIGS. 17 to 20.

FIG. 17 is an example of a class information storage unit 125 according to the first embodiment. The class information storage unit 125 stores information items, such as tenant ID, class number, lecture room number, start time, in-class time, teacher, and content ID.

The class number represents information that uniquely identifies a lecture, such as a lecture title.

The lecture room number represents information identifying a lecture room used for a lecture, and can be a lecture room name.

The start time represents the start time of a lecture identified by a lecture number, and the in-class time indicates in-class time of a lecture specified by the lecture number.

The teacher represents a user ID of a teacher giving a lecture specified by a class number.

The content ID represents a type of image data associated with a lecture specified by a class number.

Among the information items included in the class information storage unit 125, the values of information items other than the information item of "content ID" are stored based on a pre-set time table or the like. The value of the information item of "content ID" is stored in accordance with the type of image data received from the student terminal 40 by the storage control unit 16 of the server 10.

In the following description, the information stored in the class information storage unit 125 may be referred to as class information.

FIG. 17 indicates a case in which a lecture titled "Math A_01" is given by a teacher having the user ID of "tanaka@" in lecture room "A001" on October 25 for 60 minutes from 10:00.

In an example case of FIG. 17, the lecture title of "Math A_01" is associated with one or more content IDs, such as "Answer Sheet_Math A_01," "WB_Math A_01" and "Display_Math A_01." In other words, three types of image data are associated with the lecture title of "Math A_01."

The content ID of "Answer Sheet_Math A_01" indicates that the type of image data is the image data of answer sheet. The content ID of "WB_Math A_01" indicates that the type of image data is image data of whiteboard. The content ID of "Display_Math A_01" represents information associated with the browser ID used for displaying the passcode during the lecture titled "Math A_01."

If the storage control unit 16 receives the image data of the answer sheet and the class number from the student terminal 40, the storage control unit 16 stores the "Answer Sheet_Math A_01" as the value of the item of "content ID" corresponding the class number stored in the class information storage unit 125. Then, the storage control unit 16 stores the value of content ID, that is "Answer Sheet_Math A_01," in association with the received image data in the answer sheet information storage unit 126.

Further, if the storage control unit 16 receives the image data described on the whiteboard WB from the student terminal 40, the storage control unit 16 stores "WB_Math A_01" as the value of the item of "content ID" of the class information storage unit 125, and stores the received image data in the board information storage unit 127.

Further, if the passcode is displayed on the output apparatus 50 via the intermediary apparatus 20 during the lecture, the storage control unit 16 stores the "Display Math A_01" as the value of the item of "content ID" of the class information storage unit 125, and stores the browser ID of the intermediary apparatus 20 in the browser identification information storage unit 128.

FIG. 18 indicates an example of the answer sheet information storage unit 126 according to the first embodiment. The answer sheet information storage unit 126 stores information items, such as, content D, user ID, student number, file ID, upload time, and passcode. In the following description, information stored in the answer sheet information storage unit 126 may be referred to as answer sheet information.

The answer sheet information storage unit 126 stores image data of the answer sheet, which was captured by the student terminal 40. In the answer sheet information storage unit 126, the user ID indicates the account information assigned to the image data, and the file ID indicates identification information identifying the image data. Further, in the answer sheet information storage unit 126, the upload time indicates the time when the image data was uploaded, and the passcode indicates the passcode assigned to the image data.

In an example case of FIG. 18, the image data of the answer sheet having the content ID of "Answer Sheet_Math A_01" is stored. Specifically, in an example case of FIG. 18, the image data of the answer sheets uploaded from the student terminals 40 respectively used by the first student having the first user ID of "tokiwa@," the second student having the second user ID of "saito@" and the third student having the third user ID of "ando@" are stored in the answer sheet information storage unit 126.

FIG. 18 indicate a case in which the answer sheet information including the third user ID of "ando@" includes a passcode of "0000," which means that the passcode is not input when transmitting the image data from the third student terminal 40-3.

FIG. 19 indicates an example of the board information storage unit 127 according to the first embodiment. The board information storage unit 127 stores information items, such as, content ID, user ID, file ID, and date. In the following description, the information stored in the board information storage unit 127 may be referred to as board information.

In the board information storage unit 127, the file ID is the identification information identifying the image data written on the whiteboard WB, and the date indicates the date and time when the image data was captured.

In an example case of FIG. 19, the image data written on the whiteboard WB having he the content ID of "WB_Math A_01" is stored.

FIG. 20 indicates an example of the browser identification information storage unit 128 according to the first embodiment. The browser identification information storage unit 128 stores information items, such as, content ID and browser ID which are associated with each other.

In an example case of FIG. 20, the content ID of "Display_Math A_01" is associated with the browser ID of "BROWSER1." Therefore, FIG. 20 indicates a case in which the passcode is displayed during the lecture titled "Math A_01" using the intermediary apparatus 20 having the browser ID of "BROWSER1."

As above described, the storage control unit 16 can store the image data uploaded from the student terminal 40 for each type of target object to be captured (capturing target object), based on the information stored in the class information storage unit 125 in advance.

Further, the storage control unit 16 stores information indicating history of the passcode previously displayed on the output apparatus 50 by the intermediary apparatus 20 in the passcode history storage unit 129. FIG. 21 indicates an example of the passcode history storage unit 129 according to the first embodiment.

The passcode history storage unit 129 stores information items, such as, date, browser ID, and passcode. FIG. 21 indicates a case in which the passcode being displayed using the browser ID of "BROWSER1" changes at every 15-minute interval.

Further, the storage control unit 16 stores information indicating history of image data previously displayed via the intermediary apparatus 20 in the display history storage unit 130. FIG. 22 indicates an example of the display history storage unit 130 according to the first embodiment.

The display history storage unit 130 stores information items, such as, date, browser ID, user ID, and file ID. The date indicates the date and time when image data identified or specified by the file ID was displayed using the output apparatus 50 via the intermediary apparatus 20 identified or specified by the browser ID. The user ID indicates the user ID associated with the user terminal that transmits the display request of image data to the intermediary apparatus 20.

As above described, the storage control unit 16 stores the passcode, the image data, and the browser unit 23 of the intermediary apparatus 20 that is used for displaying the passcode and the image data, in association with each other.

Hereinafter, a description is given of operation of the teacher terminal 30 used in the information processing system 1 with reference to FIG. 23. The server 10 refers to information stored in each of the storage units described above, and causes the teacher terminal 30 to display information pertaining to student attendance at each lecture.

Figure 23:
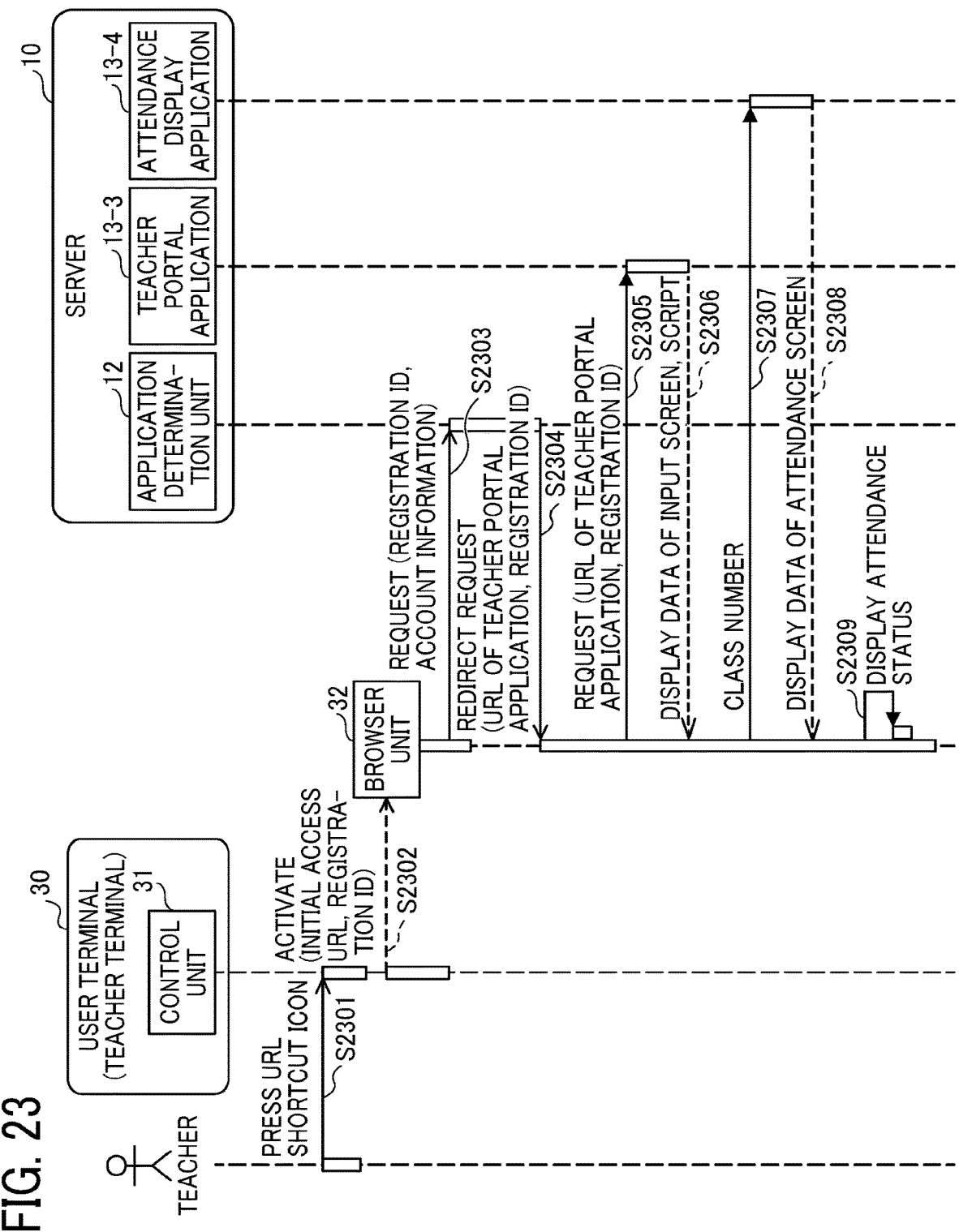
FIG. 23 is an example of a sequence of displaying a list of attendance at a teacher terminal according to the first embodiment.

FIG. 23 is an example of a sequence of displaying a list of attendance at the teacher terminal 30 according to the first embodiment.

In the teacher terminal 30, the control unit 31 detects a pressing of a URL shortcut icon displayed on the teacher terminal 30 by the teacher (step S2301).

The URL shortcut icon displayed on the teacher terminal 30 is embedded with an initial access URL used for connection to the server 10, and a registration ID of "Tag_Ed" indicating a service provided to the teacher terminal 30. In other words, the URL shortcut icon is embedded with the tag information including the initial access URL and the registration ID. The registration ID of "Tag_Ed" is associated with the application ID of "AP_EdPortal" in the registration information storage unit 124 (FIG. 9).

When the teacher terminal 30 detects the pressing of the URL shortcut icon (step S2301), the teacher terminal 30 activates the browser unit 32 to connect to the initial access URL embedded in the URL shortcut icon (step S2302).

In response to the activation of the browser unit 32 (step S2302), the browser unit 32 automatically transmits an HTTP request to the application determination unit 12 corresponding to the initial access URL embedded in the URL shortcut icon (step S2303). The HTTP request includes account information including the user ID of the teacher and the tenant ID of the user environment E1 in addition to the registration ID.

In response to receiving the HTTP request (step S2303), the application determination unit 12 of the server 10 authenticates or verifies the account information included in the HTTP request. If the authentication or verification is successful, step S2304 and subsequent steps are performed. The authentication is performed, for example, by determining whether the account information included in the HTTP request is registered or not in the account information storage unit 123.

If the authentication is successful, the application determination unit 12 transmits a response (HTTP response) including a redirect request to the browser unit 32 (step S2304).

Then, in accordance with the redirect request (step S2304), the browser unit 32 transmits (redirects) an HTTP request to the teacher portal URL (i.e., teacher portal application 13-3) that is the redirect destination (step S2305).

Then, in accordance with the HTTP request (step S2305), the teacher portal application 13-3 transmits, to the browser unit 32, a response including display data of an input screen used for inputting a class number, and a script for causing process of transmitting the class number input to the input screen to the server 10 (step S2306).

In response to receiving the response (step S2306), the browser unit 32 generates the input screen used for inputting the class number based on the display data, and displays the input screen using the output device 311.

If the browser unit 32 receives the input of the class number, the browser unit 32 reports or notifies the class number to an attendance display application 13-4 (step S2307).

Then, the attendance display application 13-4 transmits, to the browser unit 32, display data used for generating an attendance screen indicating the attendance status of students in the class indicated by the class number using the browser unit 32 (step S2308).

Then, based on the display data, the browser unit 32 displays the attendance screen indicating the attendance status of students in the class (step S2309).

Hereinafter, a description is given of an example of display on the teacher terminal 30 according to the first embodiment with reference to FIG. 24. FIG. 24 is an example of display on the teacher terminal 30 according to the first embodiment.

In FIG. 24, a screen 241 used as the attendance screen is displayed on the teacher terminal 30 in step S2309 of FIG. 23.

The screen 241 displays information 242 on a lecture identified by a class number, and information 243 indicating the status of attendance of each student in the lecture specified by the class number.

The information 243 indicating the status of attendance includes information items, such as, user ID, student number, answer sheet submission, lecture attendance, attendance/submission, and supplementary column.

The value of "answer sheet submission" indicates whether or not the image data of the answer sheet is submitted. Specifically, the value of the item of "answer sheet submission" is associated with the lecture title indicated in the information 242 in the answer sheet information storage unit 126, and the value of "answer sheet submission" indicates whether or not the image data corresponding to the user ID is stored.

The value of "lecture attendance" indicates whether or not each student attends the lecture. Specifically, the value of the item of "lecture attendance" is associated with the lecture title in the answer sheet information storage unit 126, and the value of the item of "lecture attendance" indicates whether or not the upload time of image data corresponding to the user ID matches the time when the passcode was displayed.

The value of the item of "attendance/submission" indicates whether the student corresponding to the user ID attends the lecture and submits the answer sheet. The value of the item of "supplementary column" indicates supplementary information used for determining the attendance/submission.

In the first embodiment, in the server 10, the teacher portal application 13-3 refers to the class information storage unit 125 (FIG. 17), the answer sheet information storage unit 126 (FIG. 18), and the passcode history storage unit 129 (FIG. 21).

The teacher portal application 13-3 extracts the answer sheet information including the user ID associated with the class number from the answer sheet information storage unit 126, and then the teacher portal application 13-3 determines whether or not the upload time and the passcode included in each answer sheet information are within the in-class time, and the teacher portal application 13-3 further determines whether or not the passcode included in each answer sheet information matches the passcode displayed on the output apparatus 50 during the upload time. Then, the teacher portal application 13-3 reflects a determination result to the items of "lecture attendance," "attendance/submission," and "supplementary column" in the information 243 indicating the status of attendance.

In an example case of FIG. 24, since the passcode of the answer sheet information including the third user ID of "ando@" does not match the passcode displayed during the upload time, the value of "lecture attendance" associated with the third user ID of "ando@" is set to "NO."

Thus, according to the first embodiment, it can be determined whether the uploading of the image data is performed from a position where the passcode displayed on the output apparatus 50 can be seen or viewed directly.

In the first embodiment, the passcode can be changed dynamically. Further, the first embodiment includes the passcode history storage unit 129 that stores information indicating a display history of passcode. Therefore, as to the first embodiment, the time information when the image data was uploaded can be determined based on the passcode.

In other words, the passcode can be used as information identifying a position where the upload of image data was performed and a time (time point, time period, time zone) when the uploading of image data was performed. In other words, the passcode can be used as information to determine whether the uploading of image data was performed within the lecture room during the lecture time period.

In the first embodiment, the passcode is four-digit number displayed on the output apparatus 50 via the intermediary apparatus 20, but is not limited thereto.

In the first embodiment, instead of the passcode, a message, reported or notified by the teacher that gives a lecture, can be used. In the first embodiment, the QR code can be displayed using the output apparatus 50 instead of the passcode. In this case, the student can enter or input the passcode by reading the QR code using the student terminal 40.

In this case, the QR code displayed on the output apparatus 50 corresponds to the answer sheet QR code attached to the answer sheet. In this case, the QR code displayed on the output apparatus 50 is embedded with the same information as the answer sheet QR code attached to the answer sheet.

In the first embodiment, the passcode is displayed on the output apparatus 50 and input to the student terminal 40, but the method of acquiring the passcode by the student terminal 40 is not limited thereto. For example, the passcode can be transmitted from a device associated with the server 10 using wireless communication. Specifically, for example, the passcode can be transmitted as a beacon signal.

If the beacon signal is used, the input field of the passcode set on the screen 152 of FIG. 15B is not displayed on the student terminal 40. In this case, the student terminal 40 can acquire the passcode by receiving the passcode that is being transmitted when the start button 152d is operated to shift the screen to the image capture screen of the answer sheet.

Further, in the first embodiment, the information included in the answer sheet QR code, attached to the answer sheet, includes the registration ID and the initial access URL while the account information, the student number and the class number are input to the student terminal 40 by the student, but is not limited thereto.

For example, if the common account information is provided to all of the students, the answer sheet QR code may be embedded with the registration ID, the initial access URL and the account information.

Further, the answer sheet QR code may be embedded with the registration ID, the initial access URL, the account information, and also the class number.

In this way, if the more and more information is embedded in the answer sheet QR code, information input to the student terminal 40 by the student can be reduced, and the input work load of student information can be reduced.

In the above-described first embodiment, the user environment is the educational field, but the user environment is not limited thereto. For example, the user environment may be a corporate conference room, and any environment where information indicating that the image data was captured under a specific condition is to be assigned to the image data captured by the user terminal. The specific condition means a condition that the user terminal is disposed at a position where the user terminal can acquire the passcodes that are changing over time, and the information indicating the specific condition is, for example, the passcode (specific information).

Second Embodiment

Hereinafter, a description is given of a second embodiment with reference to FIG. 25. Different from the first embodiment, the passcode is not input when the image data is uploaded in the second embodiment. Therefore, in the second embodiment, the differences from the first embodiment will be described, and for elements having the same functional configuration as those according to the first embodiment, the reference codes used in the description according to the first embodiment will be given and description thereof omitted.

Figure 25:
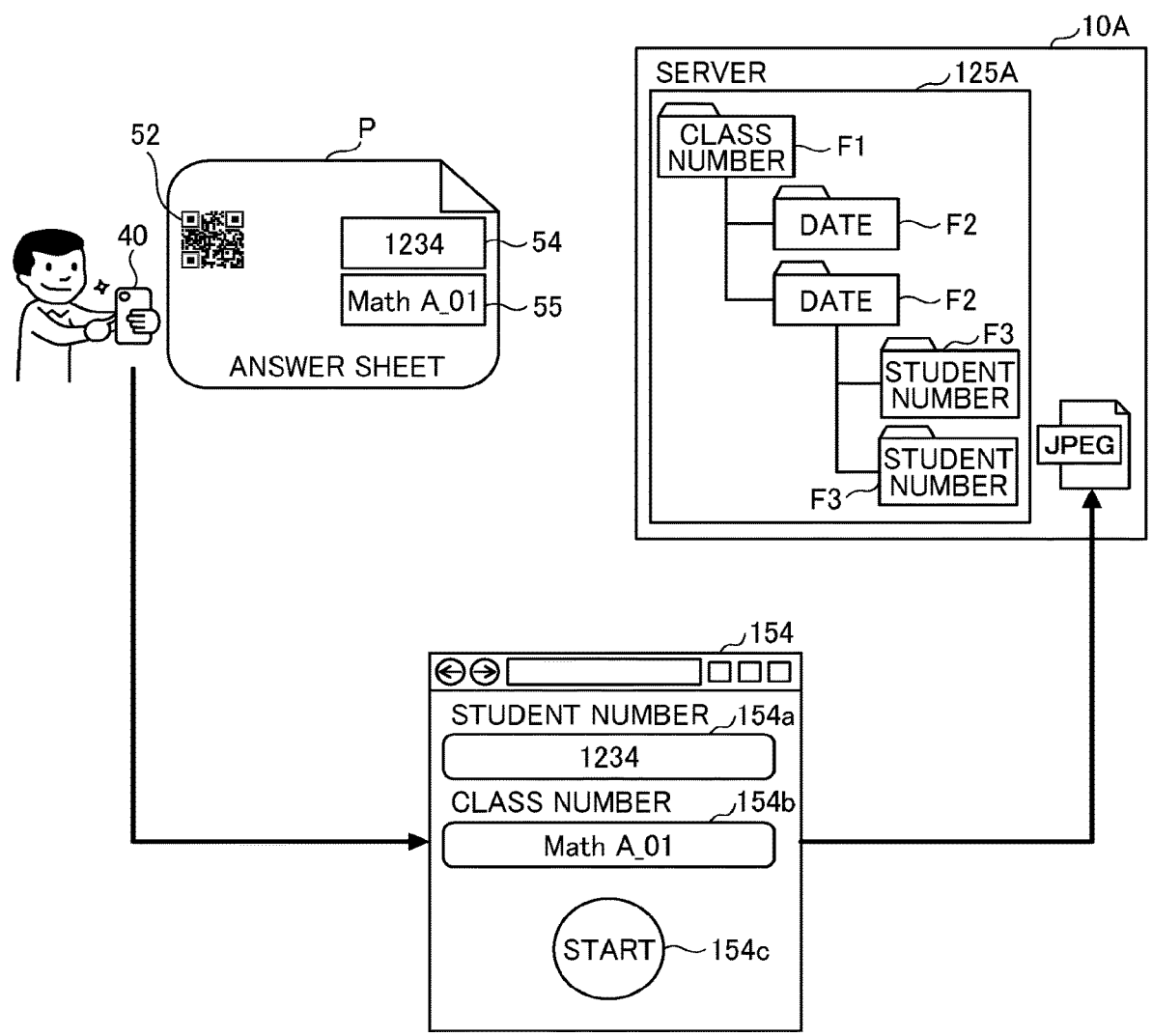
FIG. 25 is a schematic diagram illustrating a scheme of an information processing system of a second embodiment.

FIG. 25 is a schematic diagram illustrating a scheme of an information processing system of the second embodiment. In the second embodiment, in a case of uploading image data of the filled-out answer sheet P from the student terminal 40, an input of passcode is not requested.

In the second embodiment, when the student terminal 40 reads out the answer sheet QR code 52 attached to the answer sheet P, the student terminal 40 displays an input screen 154 used as an input screen using the same procedure in FIG. 13. The input screen 154 corresponds to the input screen displayed in step S1316 in FIG. 13.

In the second embodiment, since the input of passcode is not requested, the input screen 154 displays an input field 154a to input a student number and an input field 154b to input a class number.

When the student number and the class number are input on the input screen 154, the student terminal 40 uploads the image data to the server 10A using the same procedure as that of step S1317 and subsequent steps in FIG. 13.

In the second embodiment, since the passcode is not input, the image data is associated with the student number and the class number, and then uploaded to the server 10A.

As indicated in FIG. 25, the server 10A includes, for example, an image data storage unit 125A that stores the image data. The image data storage unit 125A stores, for example, a folder F1 provided for each class number, and a folder F2 under the folder F1, provided for each date when the lecture indicated by the class number was given. Then, a folder F3 for each student number is provided under the folder F2. The folders F1, F2 and F3 are storage regions or areas set in the image data storage unit 125A.

In the server 10A, when the image data associated with the class number and the student number is uploaded from the student terminal 40, the storage control unit 16 refers to the class number and the student number.

Then, the storage control unit 16 stores the image data in the folder F3 corresponding to the student number in the image data storage unit 125A, in which the folder F3 is under the folder F1 corresponding to the class number assigned to the image data and the folder F2 of the date corresponding to date and time when the image data was uploaded.

In other words, the storage control unit 16 stores the image data in the image data storage unit 125A for each group classified by the class number, the date, and the student number.

The date and time when the image data was uploaded is the date and time when the server 10A received the image data.

Therefore, in the second embodiment, when the student places the student terminal 40 over the answer sheet QR code 52, inputs the student number and the class number on the input screen 154, and then captures the image of the answer sheet P, the image data of the answer sheet P can be stored in the folder F3 corresponding to the student number.

Therefore, in the second embodiment, the captured image data can be uploaded to a specific storage destination by performing a simple procedure without performing pre-set settings for the student terminal 40.

In the second embodiment, the folder F2 and the folder F3 are provided under the folder F1 set for each class number, but is not limited thereto. For example, the image data storage unit 125A sets the folder F1 and the folder F2 alone.

In the second embodiment, the class number and the date are group identification information for grouping the image data. In the second embodiment, the group identification information can be assigned to the image data, and then the image data is uploaded to the server 10A, with which the uploaded image data can be stored in the folder set for each group.

Therefore, in the second embodiment, for example, when the teacher searches the desired image data from the image data stored in the image data storage unit 125A, the teacher can search the desired image data by opening the folder in which the desired image data is stored, with which the desired image data can be easily selected.

Further, in the second embodiment, the image data can be automatically stored in the specific folder when the image data is uploaded. Therefore, it is not necessary to sort the image data, such as sorting the image data stored in the image data storage unit 125A into the folders after uploading the image data.

Further, in the second embodiment, it is assumed that the class number and the student number are input to the student terminal 40 by the student, but is not limited thereto.

In the second embodiment, for example, a student number input field 54 and a class number input field 55 are set on the answer sheet P, and the students can write the student number in the student number input field 54 and the class number in the class number input field 55. Then, the student terminal 40 can read handwritten characters entered in the student number input field 54 and the class number input field 55 from the image data of the answer sheet P using the optical character recognition (OCR) function to obtain text data, and can assign the text data to the image data.

Further, in the second embodiment, the student number and the class number can be input from the input screen 154 and also the optical character recognition (OCR) can be performed to the student number input field 54 and the class number input field 55. In this case, only when the student number and class number input on the input screen 154 match the student number and the class number read from the student number input field 54 and the class number input field 55, the student number and the class number can be assigned to the image data.

Further, in the second embodiment, in a case when the common account information is provided to all of the students, the answer sheet QR code 52 can be embedded with the common account information and the class number. In this case, students simply input or enter student numbers, with which the input workload performed by the students can be reduced.

Further, in the second embodiment, the user environment is described as the educational field, but the user environment is not limited thereto. For example, the user environment can be a corporate conference room or the like.

Further, in the second embodiment, it is assumed that the answer sheet QR code 52 is attached to the answer sheet P, which is the target object to be captured, but is not limited thereto. The QR code corresponding to the answer sheet QR code 52 is not required to be attached with the target object to be captured. For example, it is sufficient if the QR code corresponding to the answer sheet QR code 52 is associated with the target object to be captured.

Specifically, for example, when a QR code, prepared in advance by embedding the registration ID and the initial access URL, is read by the user terminal before capturing an image of one target object, and then the image of the one target object is captured within a pre-set time period after activating the camera function of the user terminal, the one target object can be referred to as the target object associated with the QR code.

Further, as to the above-described embodiments, each of the server 10, the intermediary apparatus 20, the output apparatus 50 and the user terminals 30 and 40 can be disposed as a single computer, or can be constructed using a plurality of computers, each of which can be provided with various units (functions or means) by dividing the functions.

In conventional technologies, pre-setting operations, such as installing dedicated applications on the terminal devices, are required. Therefore, users having fewer opportunities to use functions, such as reading the QR code, have to perform the pre-setting operations, such as installing the dedicated applications, to set the functions not used frequently to the terminal devices, which is a complicated procedure for the users. Further, in conventional technologies, if a plurality of users stores image data in one storage destination using some function, a large amount of image data may be stored in the one storage destination, such that any given user may find it difficult to quickly identify desired image data when specific image data stored by a specific user is to be retrieved.

As to the above-described one or more embodiments, image data can be stored in a designated storage destination by performing a simple procedure. Further, as to the above-described one or more embodiments, image data can be stored in a storage destination while enabling an identification of desired image data easily.

Each of the functions of the one or more embodiments described above may be implemented by one or more processing circuits or circuitry. Each of the functions of the described embodiments may be implemented by one or more processing circuits or circuitry. Processing circuitry includes a programmed processor, as a processor includes circuitry. A processing circuit also includes devices such as an application specific simultaneous circuit (ASIC), DSP (digital signal processor), FPGA (field programmable gate array) and conventional circuit components arranged to perform the recited functions.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

The present disclosure can be implemented in any convenient form, for example using dedicated hardware, or a mixture of dedicated hardware and software. The present disclosure may be implemented as computer software implemented by one or more networked processing apparatuses. The network can comprise any conventional terrestrial or wireless communications network, such as the Internet. The processing apparatuses can compromise any suitably programmed apparatuses such as a general-purpose computer, personal digital assistant, mobile telephone (such as a WAP or 3G-compliant phone) and so on. Since the present disclosure can be implemented as software, each and every aspect of the present disclosure thus encompasses computer software implementable on a programmable device. The computer software can be provided to the programmable device using any storage medium for storing processor readable code such as a floppy disk, hard disk, CD ROM, magnetic tape device or solid-state memory device. The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. An information processing system including an information processing apparatus communicable with a mobile device, the information processing system comprising:
   circuitry in the information processing apparatus, configured to
   receive, from the mobile device through a network, identification information read by the mobile device from a portion of a target object;
   determine, based on the received identification information, an address of an application that activates a camera function of the mobile device;
   transmit, to the mobile device through the network, a process execution request to implement a service by using the application having the determined address, and cause the mobile device to execute an upload of image data of an entirety of the target object to the information processing apparatus based on the process execution request, the image data being captured by using the camera function; and
   store the image data captured using the camera function in a memory,
   wherein the mobile device is a user terminal.

2. The information processing system according to claim 1, wherein the identification information received by the circuitry is associated with the target object to be captured, and is readable by the mobile device.

3. The information processing system according to claim 2, wherein the identification information received by the circuitry is embedded in a two-dimensional code.

4. The information processing system according to claim 3,
   wherein the circuitry is further configured to receive user identifying information identifying a user of the mobile device with the image data, and
   wherein the image data is associated with the user identifying information and a date when the image data was received, and then the image data is stored in the memory.

5. The information processing system according to claim 4, wherein the user identifying information received by the circuitry is embedded in the two-dimensional code.

6. The information processing system according to claim 1, wherein the circuitry is further configured to:
   receive, from the mobile device, the identification information identifying the service, and group information indicating a group;
   transmit, to the device, the process execution request to implement the service by using the application having the address to activate the camera function of the mobile device, and cause the mobile device to execute the upload of the image data of the entirety of the target object captured by using the camera function, to the information processing apparatus; and
   store the image data captured by using the camera function in a storage destination of the memory associated with the group information.

7. The information processing system according to claim 6,
   wherein the identification information and the group information received by the circuitry are embedded in a two-dimensional code associated with the target object to be captured, and are readable by the mobile device.

8. The information processing system according to claim 6,
   wherein, in response to receiving the identification information, the circuitry is further configured to transmit, to the mobile device, display data used for displaying an input screen used for inputting the group information and a process execution request to cause the mobile device to transmit the group information input to the input screen to the information processing apparatus, and receive the group information input to the input screen from the mobile device.

9. The information processing system according to claim 6,
   wherein the group information received by the circuitry includes at least one of information indicating a time when the image data was captured and information identifying a user of the mobile device.

10. The information processing system according to claim 1, wherein the user terminal is any one of a smartphone, a tablet device, a PC, or a cellular phone.

11. The information processing system according to claim 1, wherein:
the mobile device comprises circuitry configured to run a web browser configured to
receive the process execution request,
activate the camera function in response to the process execution request, and
send, to the information processing apparatus, image data representing an image captured by the camera function in response to the process execution request.

12. The information processing system according to claim 1, wherein:
the sheet includes a test answer sheet.

13. The information processing system according to claim 1, wherein the circuitry is further configured to
determine, from the identification information read by the mobile device from the target object, information specifying a storage destination in the memory, the information specifying the storage destination in the memory comprising information specifying a folder in the memory; and
store the image data captured using the camera function at the storage destination in the memory.

14. The information processing system according to claim 1, wherein the identification information identifies a service providable by the information processing apparatus.

15. The information processing system according to claim 1, wherein the process execution request includes a request to activate the camera function of the mobile device.

16. The information processing system according to claim 1, wherein the target object is a sheet.

17. The information processing system according to claim 1, wherein the portion of the target object is a two-dimensional code that is assigned to the target object, and the identification information is information read by a two-dimensional code reading function of the mobile device.

18. An information processing apparatus communicable with a mobile device, comprising:
circuitry configured to
receive, from the mobile device through a network, identification information read by the mobile device from a portion of a target object;
determine, based on the received identification information, an address of an application that activates a camera function of the mobile device;
transmit, to the mobile device through the network, a process execution request to implement a service by using the application having the determined address, and cause the mobile device to execute an upload of image data of an entirety of the target object to the information processing apparatus based on the process execution request, the image data being captured by using the camera function; and
store the image data captured using the camera function in a memory,
wherein the device is a user terminal.

19. A method of processing information performed by an information processing apparatus communicable with a mobile device, the method comprising:
receiving, from the mobile device through a network, identification information read by the device from a portion of a target object and identifying a service;
determining, based on the received identification information, an address of an application that activates a camera function of the device;
transmitting, to the mobile device through the network, a process execution request to implement a service by using the application having the determined address, and causing the mobile device to execute an upload of image data of an entirety of the target object to the information processing apparatus based on the process execution request, the image data being captured by using the camera function; and
storing the image data captured using the camera function in a memory,
wherein the device is a user terminal.

20. The method according to claim 19, wherein the identification information is associated with the target object to be captured, and is readable by the mobile device.

21. The method according to claim 20, wherein the identification information is embedded in a two-dimensional code.

22. The method according to claim 21, further comprising:
receiving user identifying information identifying a user of the mobile device with the image data,
wherein the image data is associated with the user identifying information and a date when the image data was received, and then the image data is stored in the memory.

23. The method according to claim 22, wherein the user identifying information is embedded in the two-dimensional code.

24. The method according to claim 19, further comprising:
receiving, from the mobile device, the identification information identifying the service, and group information indicating a group;
transmitting, to the mobile device, a process execution request to implement the service by using the application having the determined address to activate the camera function of the mobile device, and causing the mobile device to execute the upload of the image data of the target object captured by using the camera function, to the information processing apparatus; and
storing the image data captured by using the camera function in a storage destination of the memory associated with the group information.

25. The method according to claim 24,
wherein the identification information and the group information are embedded in a two-dimensional code associated with the target object to be captured, and are readable by the mobile device.

26. The method according to claim 24, further comprising:
in response to receiving the identification information, transmitting, to the mobile device, display data used for displaying an input screen used for inputting the group information and a process execution request to cause the mobile device to transmit the group information input to the input screen to the information processing apparatus; and
receiving the group information input to the input screen from the mobile device.

27. The method according to claim 19, wherein the portion of the target object is a two-dimensional code that is assigned to the target object, and the identification information is information read by a two-dimensional code reading function of the mobile device.

* * * * *